United States Patent
Gayko et al.

(10) Patent No.: US 8,797,417 B2
(45) Date of Patent: Aug. 5, 2014

(54) IMAGE RESTORATION METHOD IN COMPUTER VISION SYSTEM, INCLUDING METHOD AND APPARATUS FOR IDENTIFYING RAINDROPS ON A WINDSHIELD

(75) Inventors: Jens Gayko, Offenbach/Main (DE); Martin Benjamin Roser, Karlsruhe (DE); Jad Camille Halimeh, Karlsruhe (DE)

(73) Assignee: Honda Motor Co., Ltd., Tokyo (JP)

( * ) Notice: Subject to any disclaimer, the term of this patent is extended or adjusted under 35 U.S.C. 154(b) by 210 days.

(21) Appl. No.: 13/144,985

(22) PCT Filed: Jan. 8, 2010

(86) PCT No.: PCT/JP2010/000092
§ 371 (c)(1),
(2), (4) Date: Jul. 18, 2011

(87) PCT Pub. No.: WO2010/084707
PCT Pub. Date: Jul. 29, 2010

(65) Prior Publication Data
US 2011/0273582 A1    Nov. 10, 2011

(30) Foreign Application Priority Data
Jan. 20, 2009    (JP) ............... PCT/JP2009/000181

(51) Int. Cl.
*H04N 5/228* (2006.01)
*H04N 7/18* (2006.01)
*G06K 9/00* (2006.01)
*G06T 5/50* (2006.01)
*G06T 5/00* (2006.01)

(52) U.S. Cl.
CPC . *G06T 5/005* (2013.01); *G06T 5/50* (2013.01); *G06T 2207/10021* (2013.01); *G06T 2207/30252* (2013.01)
USPC .............. 348/222.1; 348/154; 382/154

(58) Field of Classification Search
USPC .................................... 348/148, 47
See application file for complete search history.

(56) References Cited

U.S. PATENT DOCUMENTS 7,602,945 B2    10/2009    Kubo et al.
7,609,857 B2    10/2009    Franz
(Continued)

FOREIGN PATENT DOCUMENTS

| JP | 2005-515565 A | 5/2005 |
|---|---|---|
| JP | 2005-346387 A | 12/2005 |
| JP | 2007-074326 A | 3/2007 |
| WO | 2006-109398 A1 | 10/2006 |
| WO | 2010/084521 A1 | 7/2010 |
| WO | 2010076064 | * 7/2010 |

OTHER PUBLICATIONS

Machi A et al., "Accurate Spatio-temporal Restoration of Compact Single Frame Defects in Aged Motion Pictures", Iamge Analysis and Processing, 2003, Proceedings. 12th International Conference on Sep. 17-19, 2003, Piscataway, NJ USA, IEEE, Sep. 17, 2003, pp. 454-459, XP010659435, ISBN: 978-0-7695-1948-7 * the whole document *.

Hiroyuki, Kurihata et al., "Detection of Raindrops on a Windshield From an In-Vehicle Video Camera", International Journal of Innovative Computing, Information & Control, Dec. 1, 2007, pp. 1583-1591, XP55028330, Japan, ISSN: 1349-4198 * abstract; figures 2, 5 *.

Schallauer, P. et al., "Automatic Restoration Algorithms for 35mm Film", Videre: Journal of Computer Vision Research, Massachusetts Institute of Technology, US, vol. 1, No. 3, Jan. 1, 1999, pp. 60-85, XP002382262, ISSN: 1089-2788 * p. 66-68; figures 10, 11 *.

*Primary Examiner* — Sinh Tran
*Assistant Examiner* — Shahbaz Nazrul
(74) *Attorney, Agent, or Firm* — Carrier Blackman & Associates, P.C.; Joseph P. Carrier; Anne G. Sabourin

(57) ABSTRACT

A vehicle is equipped with a camera (which may be a stereoscopic camera) and a computer for processing the image data acquired by the camera. The image acquired by the camera is processed by the computer, and features are extracted therefrom. The features are further processed by various techniques such as object detection/segmentation and object tracking/classification. The acquired images are sometimes contaminated by optical occlusions such as raindrops, stone-chippings and dirt on the windshield. In such a case, the occluded parts of the image are reconstructed by optical flow estimation or stereo disparity estimation. The fully reconstructed image is then used for intended applications.

2 Claims, 24 Drawing Sheets

(56) References Cited

U.S. PATENT DOCUMENTS

| | | |
|---|---|---|
| 2006/0065821 A1* | 3/2006 | Stam et al. ............... 250/227.25 |
| 2009/0016636 A1* | 1/2009 | Kasashima et al. ........... 382/274 |
| 2009/0180682 A1* | 7/2009 | Camus ......................... 382/154 |
| 2009/0244263 A1* | 10/2009 | Saito .............................. 348/47 |
| 2011/0043624 A1* | 2/2011 | Haug ........................... 348/135 |
| 2011/0273564 A1* | 11/2011 | Seger et al. ................... 348/148 |
| 2012/0087573 A1* | 4/2012 | Sharma et al. ................ 382/154 |
| 2012/0169878 A1* | 7/2012 | Heenan et al. ................ 348/148 |

\* cited by examiner

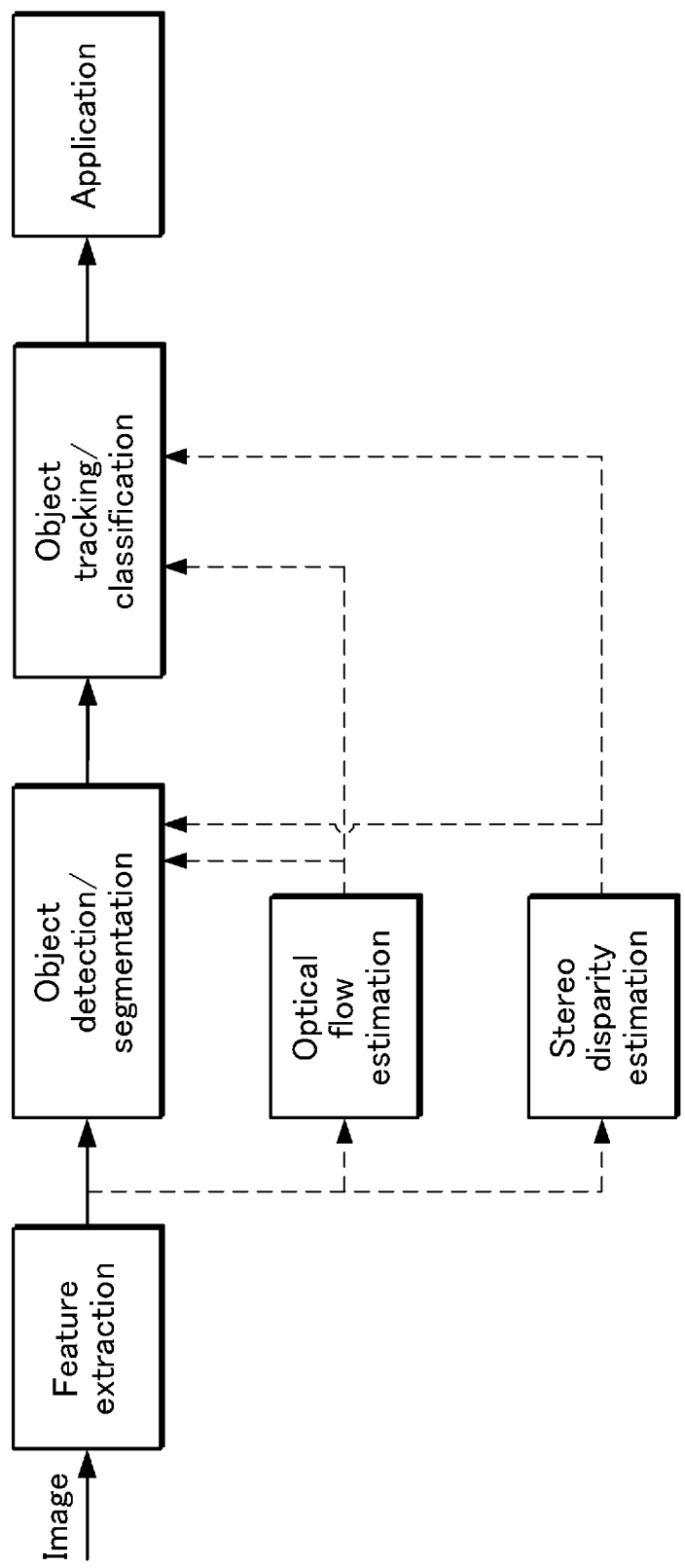

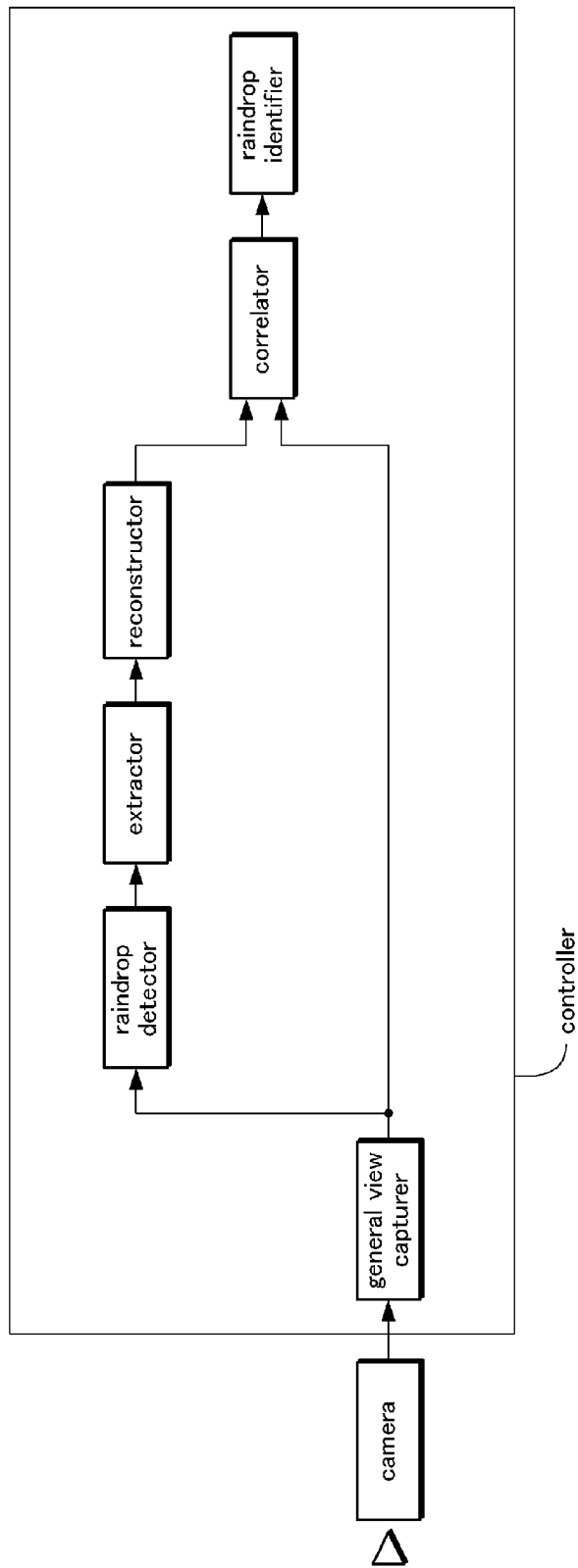

IMAGE RESTORATION METHOD IN COMPUTER VISION SYSTEM, INCLUDING METHOD AND APPARATUS FOR IDENTIFYING RAINDROPS ON A WINDSHIELD

TECHNICAL FIELD

The present invention generally relates to an improved computer vision system, and in particular to a technology for improving robustness of computer vision by eliminating interferences of contamination in the vision such as raindrops and other disturbing optical occlusions. The present invention also relates to a method and apparatus for identifying raindrops on a windshield of a vehicle.

BACKGROUND OF THE INVENTION

Vision based advanced driver assistance systems (ADAS) extract knowledge about the surrounding traffic scene by object detection and tracking. Typical objects to detect include other vehicles, lane markers, traffic signs, pedestrians, and others. A typical image processing system may comprise the modules feature extraction, object detection, tracking, and classification as well as the ADAS function/application itself. A feature extraction module analyses low level properties of the captured frame like edges, corners, intensity histograms, and others. Optionally optical flow estimation may be applied to gather information on the temporal behaviour of the scene. Stereo camera systems are a possible technology for future vision based ADAS. Depth information of a scene can be obtained by estimating the disparity of a pair of images.

Furthermore, object tracking is a known technique to gain knowledge about the temporal behaviour of detected objects and to support object classification. For example, Kalman-filters or Extended-Kalman-filters are widely used for tracking.

Correlation techniques on image regions and/or image features are used by known object tracking algorithms to find objects in subsequent images of a video stream. For these approaches it is crucial that a certain object has a similar appearance on subsequent image frames. In case of local image distortions this requirement may not be fulfilled and hence, these algorithms may "lose" the object of interest. Local image distortions can be caused by raindrops on the windshield, contamination of windshield, stone-chippings, and other disturbed areas on the windshield.

Effects of bad weather (e.g. raindrops on the windshield), contaminated areas as well as small damages (stone-chippings) lead to several types of image disturbances like (partial) occlusion of image regions, blur, and local distortions. As a consequence feature extraction performance will deteriorate as well as the detection performance of following modules.

JP Patent Laid Open Publication No. 2005-346387 (Patent Document 1: Application No. 2004-164992) describes a method for detecting moving objects with a camera mounted on a moving vehicle. In Patent Document 1, "noise" is mentioned as a disturbance which can be eliminated by this prior invention. However, according to the disclosure of this document, the prior invention deals with disturbances caused by bumpy roads. Therefore the "noise" mentioned in this patent document is a "pitching" of the vehicle which is compensated in an ingenious way. However, this method can hardly be applied to image restoration in rainy weather because there will be raindrops on almost every image and as a result the latency time for image processing will increase due to the need to wait for the next image frame or an image frame without noise.

JP Patent Laid Open Publication No. 2007-074326 (Patent Document 2: Application No. 2005-258667) describes a method for tracking moving objects which are temporarily optically occluded by an obstacle. Furthermore a warning method for such temporarily occluded objects is described.

PCT/JP2009/000181 filed Jan. 20, 2009 (Patent Document 3) and published Jul. 29, 2010 as WO 2010/084521 discloses a method for detecting raindrops on a windshield by comparing the image formed by each suspected spot on the windshield with an external view by applying a certain coordinate conversion to one of them and evaluating the correlation between the two images.

Meanwhile, there have been efforts to identify the presence of raindrops on a windshield for the purpose of automatically activating a windshield wiper. The previous proposals were mostly based on an electric sensor whose resistivity changes when raindrops deposit on the sensor. This can be achieved at a relatively low cost, but is not highly reliable because the surface of the sensor could be contaminated over time.

More recently, there has been a growing interest in the use of a vehicle vision system for tracking a lane marker or a center line, detecting an obstruction on the road, detecting a pedestrian and other purposes. Such a vision system can be conveniently used for detecting the presence of raindrops on a windshield. However, due to several factors, the detection of raindrops on windshields is a challenging computer vision task:

1. Raindrops have a large variety of different shapes and sizes.
2. Raindrops are blurred since they are out of focus (the camera is focusing on the traffic scene and not on the windshield).
3. Due to the transparency of the windshield, the observed raindrops are superimposed by interfering background information (for normal driver assistance systems, it can be defined vice-versa: the superimposition of raindrops is interfering the observed traffic scene).
4. Raindrops themselves are transparent, i.e., there are no defined features that are characteristic for raindrops. Raindrops rather reflect characteristic points from the environmental traffic scene.

Japanese patent laid open publication (kokai) No. 10-148681 discloses a raindrop detecting method which detects a raindrop on a windshield as an area demonstrating a higher luminance than the surrounding areas. This however may not work as desired when the general view from the vehicle includes areas of high luminances or bright spots caused by emission and/or reflection of light.

Japanese patent laid open publication (kokai) No. 9-142259 discloses a raindrop detecting device which detects a raindrop on a windshield as disturbances in the transmission of light through the windshield. This device however requires a light emitter and a light receiver dedicated for the detection of raindrops. Therefore, it has the disadvantage of requiring added expenses and reserving suitable mounting spaces for the light emitter and light receiver in a limited available space of a vehicle.

BRIEF SUMMARY OF THE INVENTION

In view of such problems of the prior art, a primary object of the present invention is to provide a method for improving robustness of image processing.

A second objection of the present invention is to provide a method for reconstructing occluded images by using optical information acquired from a different viewpoint.

According to the present invention, such objects can be accomplished by providing a method for image restoration in a computer vision system, comprising: capturing a first image of an object that is optically occluded by a contamination; capturing a second image of the object from a different view point; and reconstructing an optically occluded part of the first image by using information in the second image.

Thereby, the occluded part of the image can be reconstructed by making use of redundant optical information. More specifically, this is achieved by use of temporal and spatial mapping techniques to reconstruct locally distorted image areas or to exclude affected areas from further image processing. These mapping techniques overcome problems of prior art like increased latency times. Thus, a full image can be made available to the computer vision system with a minimum latency time by using minimum hardware resources.

Typically, the first and second image are captured through a substantially transparent sheet that could be optically occluded by contamination, and the contamination may include a member selected from a group consisting of a raindrop, a stone-chipping and a smear deposit on the transparent sheet.

According to a certain aspect of the present invention, the first image is captured by a camera placed at a first position, and the second image is captured by the same or a different camera placed at a second position which is displaced from the first position in a direction perpendicular to an optical axis of the camera at the first position.

This is based on stereo disparity estimation which normally provides depth information of the captured image, but additionally provides certain spatial redundancy enabling the reconstruction of optical occlusion.

According to another aspect of the present invention, the object is stationary and the first image is captured by a camera carried by a moving platform at a first time point, the second image being captured by the camera at a second time point which is temporally displaced from the first time point.

This is based on optical flow estimation. When the object is stationary, and the images thereof are captured by a camera or cameras carried by a moving platform such as a vehicle, the object appears to move in the view of the camera due to the relative motion between the object and moving platform whereas the optical occlusion remains stationary in the view of the camera. Therefore, a part of the object which is optically occluded at one time point may not be so in a subsequent or preceding time point. This temporal redundancy enables the reconstruction of the optically occluded image.

If the optical occlusion is temporary in nature, such as when the optical occlusion is caused by raindrops on a windshield or by water splashes on a windshield caused by an adjacent vehicle, and is subsequently removed by the activation of a wiper device, it is possible to reconstruct the occluded image by replacing the current view of the image with a view of the same image at an immediately preceding time point.

According to an embodiment based on such a principle, the image of the object is captured as a plurality of frames corresponding to successive time points, and upon detection of an optical occlusion in any one of the frames, the optically occluded part of the image in the incident frame is reconstructed from a corresponding part of the image in a preceding frame.

This is particularly beneficial in a situation where the image of the object is captured through a substantially transparent sheet that can be optically occluded by contamination and is equipped with a wiper device configured to wipe a surface of the transparent sheet to remove such contamination at a regular interval, and the reconstruction of the optically occluded part of the image is performed by using a frame from which contamination has just been removed by the wiper device.

Another object of the present invention is to provide a method for detecting raindrops on a windshield which is both reliable and economical.

A further object of the present invention is to provide a method for detecting raindrops on a windshield that can be realized by using a vehicle vision system.

According to the present invention, such an object can be accomplished by providing a method for identifying raindrops on a windshield of a vehicle by using a vision system, comprising: capturing a general image of a scene ahead of the vehicle as transmitted through the windshield by using a camera; detecting a raindrop candidate in the general image as a point of interest; extracting an actual image of the raindrop candidate from the general image and measuring a size of the raindrop candidate; reconstructing an image of the raindrop candidate from the general image according to an optical model based on the measured size; obtaining a correlation between the actual image of the raindrop candidate and the reconstructed image of the raindrop candidate; and identifying the raindrop candidate as an actual raindrop when the obtained correlation is higher than a prescribed level.

Thereby, the presence of a raindrop can be determined accurately because a high correlation between the actual raindrop image and reconstructed raindrop image is not likely to be caused by coincidence. Furthermore, it can be implemented by using an existing vehicle vision system simply by adding a new program so that an additional cost can be minimized. Typically, the optical model of the raindrop candidate consists of a convex lens given as a spherical cap.

It is also possible to reconstruct the general image from an image of a raindrop, and evaluate a correlation between the reconstructed general image and the actual general image.

According to another aspect of the present invention, there is provided an apparatus for identifying raindrops on a windshield of a vehicle by using a vision system, comprising: a camera mounted on the vehicle to capture a view ahead of the vehicle through the windshield as a general image; a raindrop detector that detects a raindrop candidate as a point of interest in the general image; an extractor that extracts an actual image of the raindrop candidate from the general image and measures a size of the raindrop candidate; an image reconstructor that reconstructs an image of the raindrop candidate as a refracted image of the general image according to an optical model based on the measured size; a correlator that obtains a correlation between the actual image of the raindrop candidate and the reconstructed image of the raindrop candidate; and a raindrop identifier that identifies the raindrop candidate as an actual raindrop when the correlation is higher than a prescribed level.

Alternatively, the apparatus for identifying raindrops on a windshield of a vehicle by using a vision system may comprise: a camera mounted on a part of a vehicle to capture a view ahead of the vehicle through the windshield as a general image; a raindrop detector that detects a raindrop candidate as a point of interest in the general image; an extractor that extracts an actual image of the raindrop candidate from the general image and measures a size of the raindrop candidate; an image reconstructor that reconstructs an image of the general image as a refracted image of the raindrop candidate according to an optical model based on the measured size; a correlator that obtains a correlation between the captured general image and the reconstructed general image; and a raindrop identifier that identifies the raindrop candidate as an actual raindrop when the correlation is higher than a prescribed level.

To improve the accuracy of identifying raindrops even in the presence of other optical noises and disturbances, a raindrop candidate may be extracted as a point that remains stationary while the vehicle travels or as a point that moves along a path and at a speed determined by the size of the raindrop, an outer contour of the windshield and an airspeed of the vehicle while the vehicle travels.

BRIEF DESCRIPTION OF THE DRAWINGS

Now the present invention is described in the following with reference to the appended drawings, in which:

FIG. 1 is a block diagram of an exemplary image processing system according to the present invention that can be used for driver assistance systems among other possibilities;

FIG. 24 is a view similar to FIG. 2 showing a modified embodiment of the present invention.

DETAILED DESCRIPTION OF THE PREFERRED EMBODIMENTS

FIG. 1 illustrates the basic concept of the present invention. The present invention is typically employed on a vehicle to capture the image of an external view for the purposes of lane tracking, detection of obstacles, detection of traffic signs or tracking a leading vehicle for maintaining a suitable distance to it, among other possibilities.

The vehicle is equipped with a camera (which may be a stereoscopic camera) and a computer for processing the image data acquired by the camera. The image acquired by the camera is processed by a computer, and features are extracted therefrom. The features are further processed by various techniques such as object detection/segmentation and object tracking/classification. The required image handling processes are executed by suitable computer programs running on the computer. The acquired images are sometimes contaminated by optical occlusions such as raindrops, stone-chippings and dirt on the windshield. In such a case, the occluded parts of the image are reconstructed by optical flow estimation or stereo disparity estimation which is described hereinafter. The fully reconstructed image is then used for intended applications. Often object tracking is closely coupled with object classification.

Stereo Disparity Estimation

Future vision systems are expected to realize several ADAS functionalities (e.g. recognition of lane markers, traffic signs, pedestrians, leading vehicles, traffic lights, and more). Some of these functionalities require depth information acquired by a stereo camera setup; some may also operate on a single camera image (e.g. lane marker recognition). The idea is to use the redundancy of the stereo camera pair to reconstruct the distorted image areas for those functionalities which can operate on single camera images.

Figure 2A:
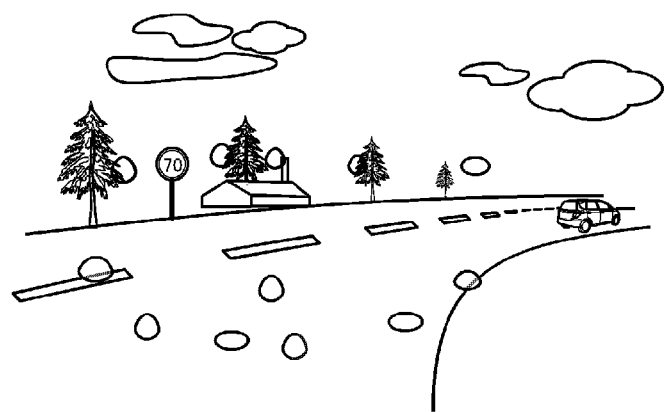
FIG. 2 shows a left (a) and right (b) camera frame of a street view disturbed by raindrops, and a reconstructed right image (c) by copying information from (a) to (b)
Figure 2B:
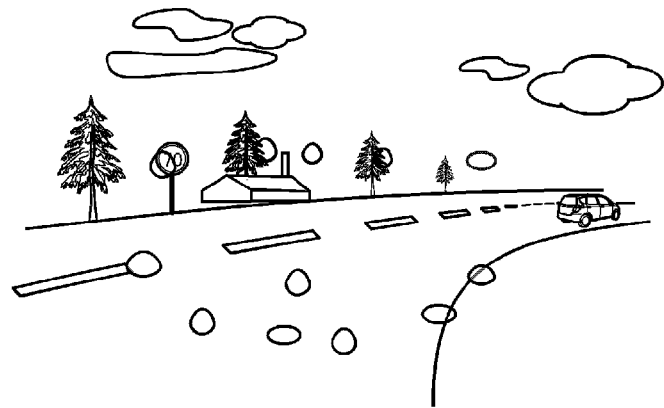
Figure 2C:
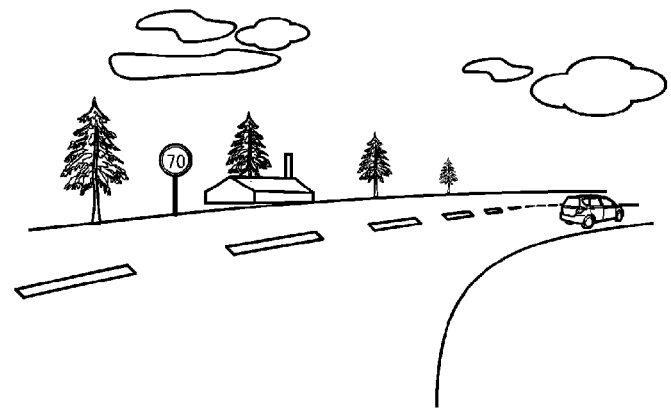

For objects on a known horizontal plane in front of the vehicle (e.g. road surface) the image of one camera of a stereo camera pair can be calculated from the other camera image. See "Inverse perspective mapping technique", Mallot H. A., Bülthoff H. H., Little J. J. & Bohrer S. (1991): Inverse perspective mapping simplifies optical flow computation and obstacle detection. Biological Cybernetics 64:177-185, for more detailed discussion on this subject matter. With the proposed method road markings (lane markings, stop lines, . . . ) in front of the vehicle which are distorted in one camera image by a raindrop or disturbing particles can be reconstructed by use of the image of a second camera. FIG. 2 shows a left (a) and right (b) camera frame with a street surface disturbed by raindrops and reconstructed right image (c) by copying information from (a) to (b).

Information on locations of raindrops will be obtained by the methods described in Patent Document 3 or other suitable methods. This method applies especially for regions with considerable disparity between corresponding features in both camera images (=near-range). This method can be applied furthermore to all objects with a known disparity between left and right camera image.

Figure 3:
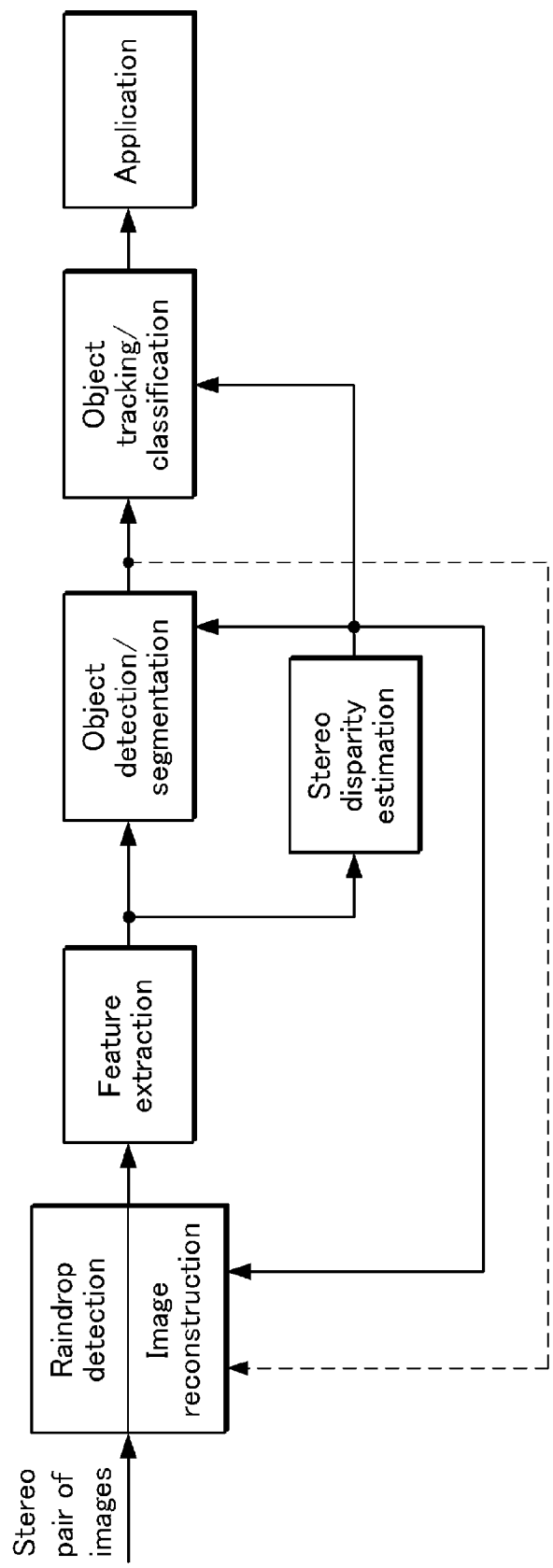
FIG. 3 is an extended block diagram with raindrop detection and low-level image reconstruction.

FIG. 3 shows an extended block diagram of a stereo image processing system with low-level image reconstruction to realize the idea described here. The occluded parts of the captured image are identified by detecting raindrops by using the method proposed in Patent Document 3, for instance. This method is based on an ingenious use of inverse perspective mapping technology to reconstruct the image. Normally "inverse perspective mapping" method is applied to detect obstacles on a known surface like the road surface. Here this method is used in an innovative way. This method allows an image reconstruction for the actual image and thus an image processing without increased latency time.

For objects in the far range the disparity between the images of a stereo camera setup can be neglected. In that case a simple copying of pixels from left camera image to right camera image (and vice versa) can be applied for regions which are disturbed in one camera image. This idea is a modification of the idea described above especially for objects in the far range. This idea can be applied to the architecture shown in FIG. 3.

This method is based on the invention disclosed in Patent Document 3. Furthermore it uses redundancy of stereo camera images to reconstruct the image. This redundancy is used in an innovative way because just affected pixels are reconstructed. This method allows an image reconstruction for the actual image and thus an image processing without increased latency time.

Figure 4A:
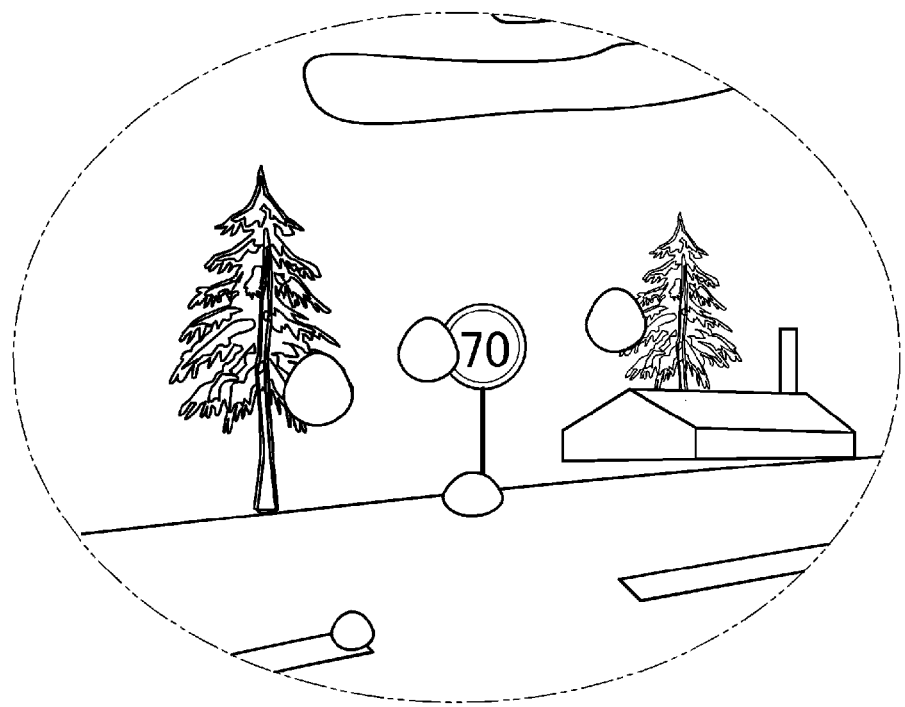
FIG. 4 shows the appearance of the relevant object in the left and right camera images.
Figure 4B:
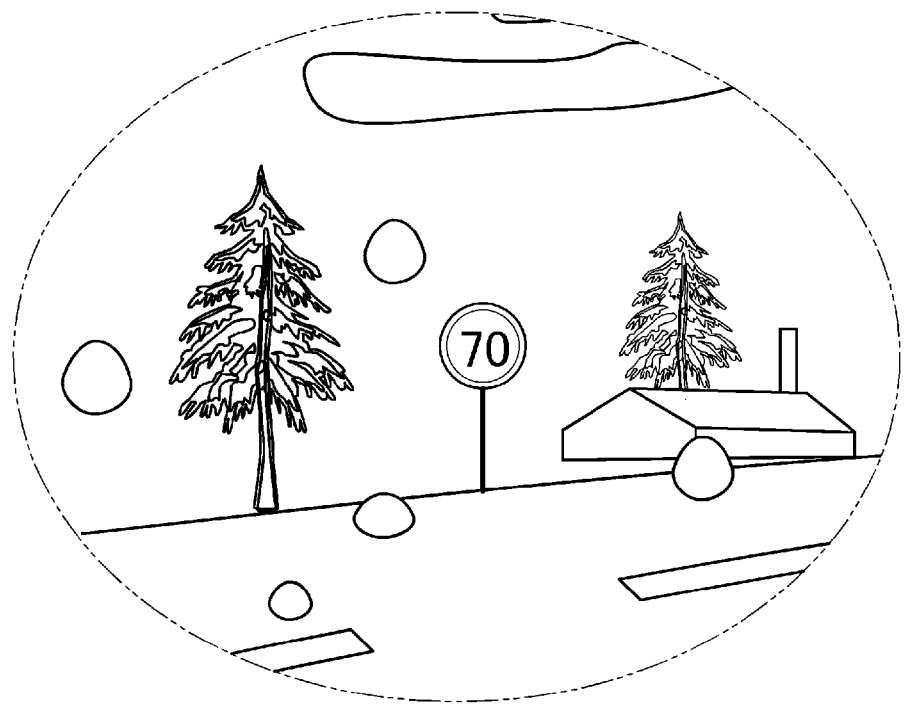

In a stereo system a region of interest (ROI) can be selected from the image (left or right) which is less affected by disturbed areas for object recognition purposes. Explanation: If depth information obtained by stereo matching is not of relevance for a particular (sub-) function (e.g. traffic sign recognition), redundancy of the stereo system can be used (FIG. 4). This idea is a modification of the above discussed method and covers complete ROIs instead of single pixels affected by a raindrop. Therefore results of object segmentation step are required (see dashed line in FIG. 3).

This method uses redundancy of stereo camera images to reconstruct the image. This redundancy is used in clever way because only affected ROIs are reconstructed. This method allows an image reconstruction for the actual image and thus an image processing without increased latency time.

Optical Flow Estimation

Figure 5:
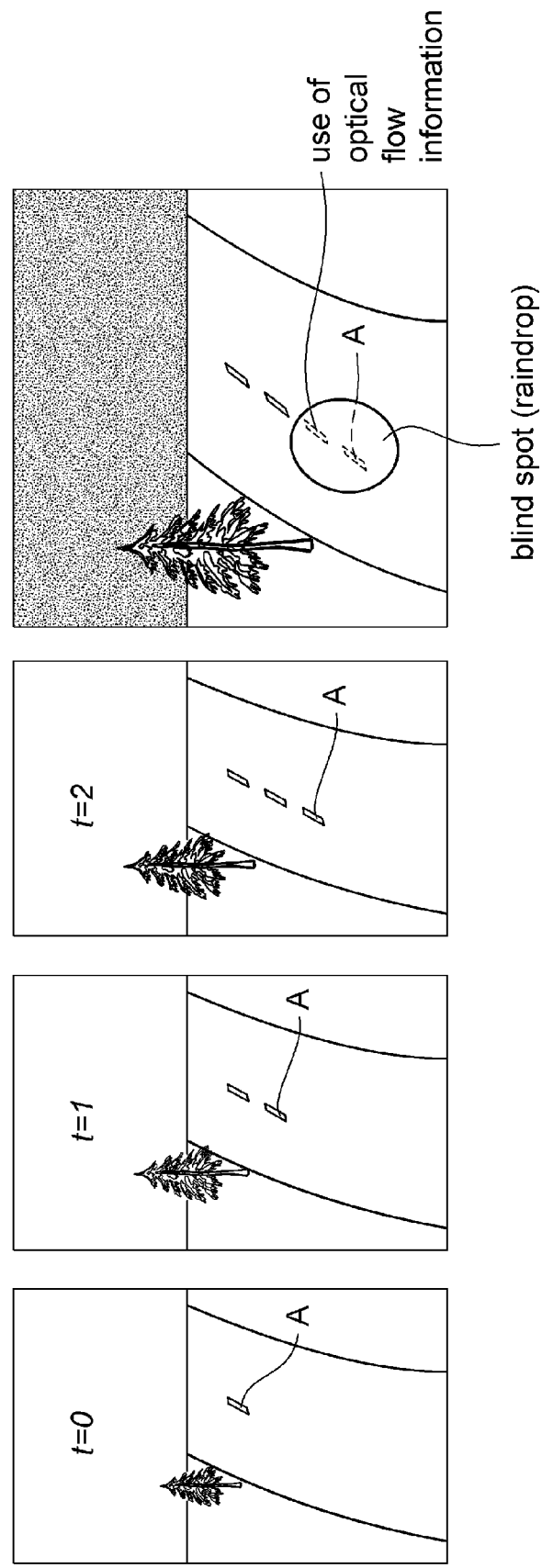
FIG. 5 shows the reconstruction of ground plane by optical-flow remapping.

For objects with a known optical flow (e.g. objects on the ground plane) disturbed areas in an image captured at a time $t_n$ can be reconstructed by remapping corresponding image areas captured at time $t_{n-1}$. This method allows a reconstruction of disturbed areas. For this idea no stereo camera setup is required. FIG. 5 shows an example of a reconstruction of lane markers by use of optical flow. In FIG. 5, the external view includes sky in the top and a road surface in the bottom. The road surface includes a lane marker. As the vehicle travels on the road, each point on the lane marker progressively moves downward from one time point to the next. See the change in the position of a point A at time $t_0$, $t_1$ and $t_2$.

By optical flow estimation or optical flow remapping, it is possible to estimate the position of such a point A at a certain point from the position of the same point at a previous time point. The odometer of the vehicle may be used for providing the position or distance information of the vehicle when the point A or an object on the road consists of a stationary object. By using a suitable algorithm, it is also possible to predict the position of a moving object in the external view at a certain time point from two or more positions of the same object at preceding time points.

Figure 6:
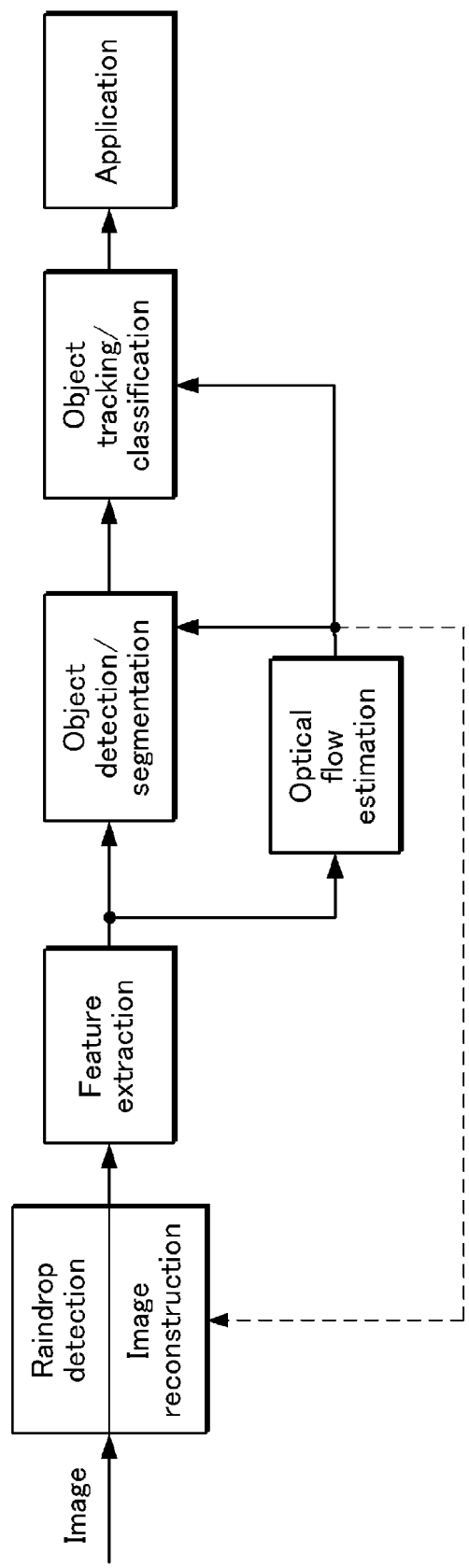
FIG. 6 is an extended block diagram with raindrop detection and image reconstruction based on optical flow.

FIG. 6 is a block diagram for the image reconstruction based on optical flow estimation combined with raindrop detection. This is similar to the block diagram of FIG. 3, but differs therefrom in using optical flow estimation instead of stereo disparity estimation.

Figure 7:
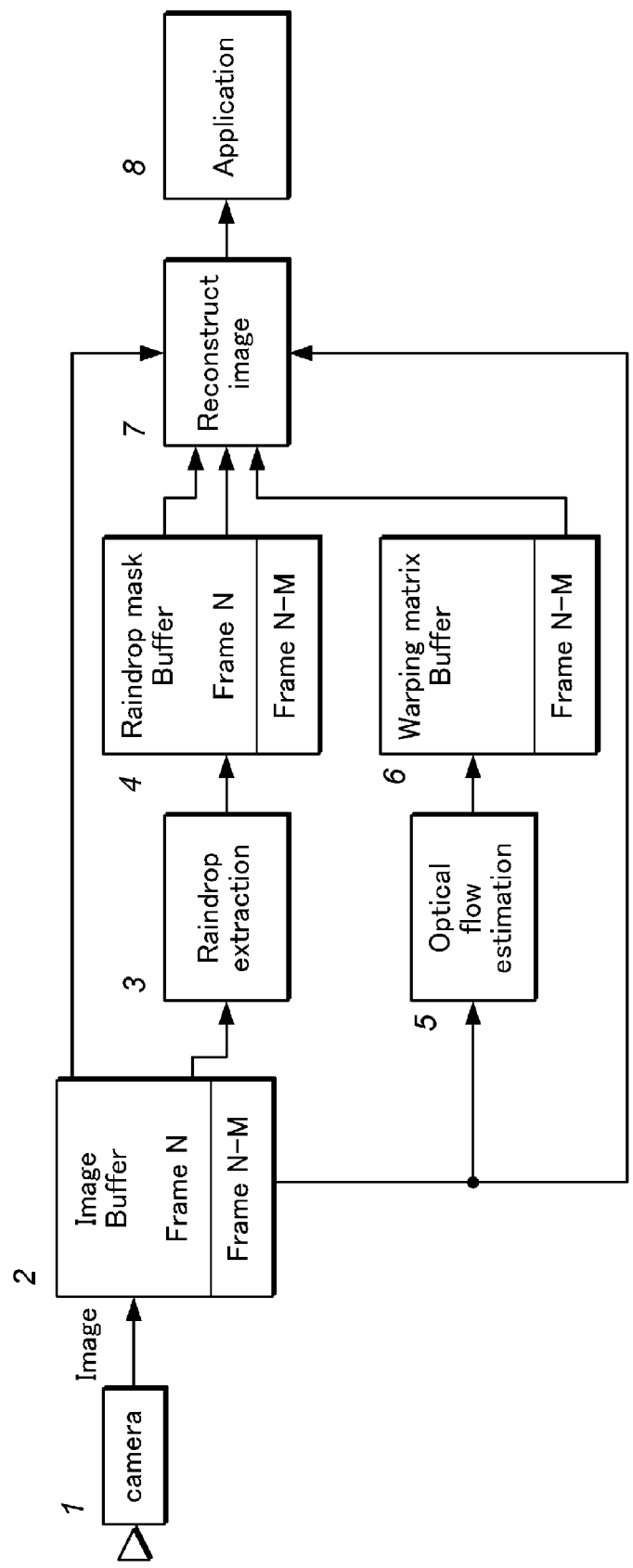
FIG. 7 is a flow chart of image reconstruction based on optical flow.

FIG. 7 illustrates an algorithm for executing the image reconstruction based on optical flow estimation.

Figure 8:
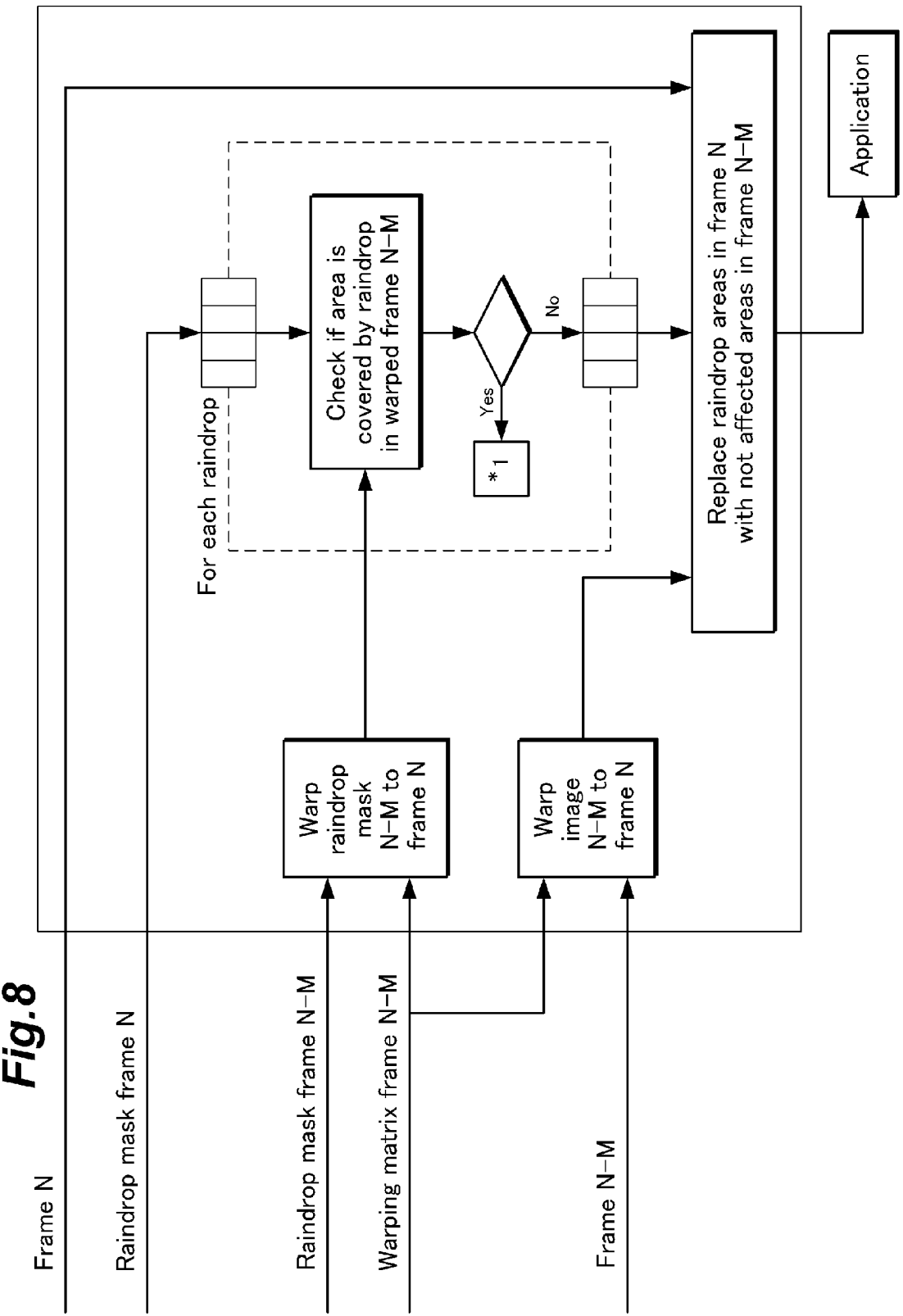
FIG. 8 is a detailed flow chart of image reconstruction based on optical flow.

1. The image captured by the camera (1) is buffered (2) and a set of subsequent frames is extracted. Raindrops are detected (3) using algorithms as described in Patent Document 3. A raindrop mask is computed and buffered (4).
2. Parallel optical flow estimation (5) (maybe supported by odometers) is used to calculate the warping matrix/homography (6) to warp previous images to the geometry of the current image. These warping matrices are buffered for each image.
3. The current image and the warped previous image are multiplexed based on the raindrop mask to reconstruct the image (7). More details on that block are depicted in FIG. 8.
4. Finally the reconstructed image is transferred to the application (8).

The flow diagram of image reconstruction is shown in more detail in FIG. 8. For each area covered by a raindrop in the current frame N it is checked if the same area in the previous image N-M (after warping) is also affected by a raindrop. If not the area in the current raindrop is replaced. If yes there are two alternatives:

1. No action is taken. As a consequence this area will not be reconstructed. If for example 5% of the windshield are covered by raindrops this will happen for approximately $(0.05*0.05)*100=0.25\%$ of the (visible) windshield area which can be neglected for most applications. The assumption behind this calculation is as follows: Suppose that 5% of the image areas are disturbed by raindrops in an equal distribution (no fixed pattern for the raindrop distribution) for both frames N and N-M. The described algorithm tries to reconstruct a disturbed area in frame N by using a warped area of frame N-M. Due to the warping procedure, it is assumed that the probability that the warped area in frame N-M is disturbed as well is an independent event from the fact that the area was disturbed in frame N. Due to this independence the probabilities for the event that an "area is disturbed in frame N" AND "the warped area from frame N-M is disturbed as well" (both 5%) can be multiplied. In other words, this is covered by the robustness of most image processing applications.
2. If more frames are buffered it can be checked if the area can be reconstructed from a frame N-K. This requires more buffer space.

Evidence of the performance of this method is shown in the report "Video-based raindrop detection for improved image registration", Martin Roser, Andreas Geiger, Institut für Mess- and Regelungstechnik, Universitat Karlsruhe (TH), Jul. 3, 2009.

The raindrop detection is based on the invention disclosed in Patent Document 3. Furthermore optical flow compensation is applied to reconstruct the image. However "normal" optical flow estimation methods (e.g. based on correlation technique) will probably fail in this application because of the disturbances caused by raindrops. So an estimation of the optical flow of the road surface by using odometer information is proposed. This method allows an image reconstruction for the actual image and thus an image processing without increased latency time.

Photometric Model Estimation

Figure 9:
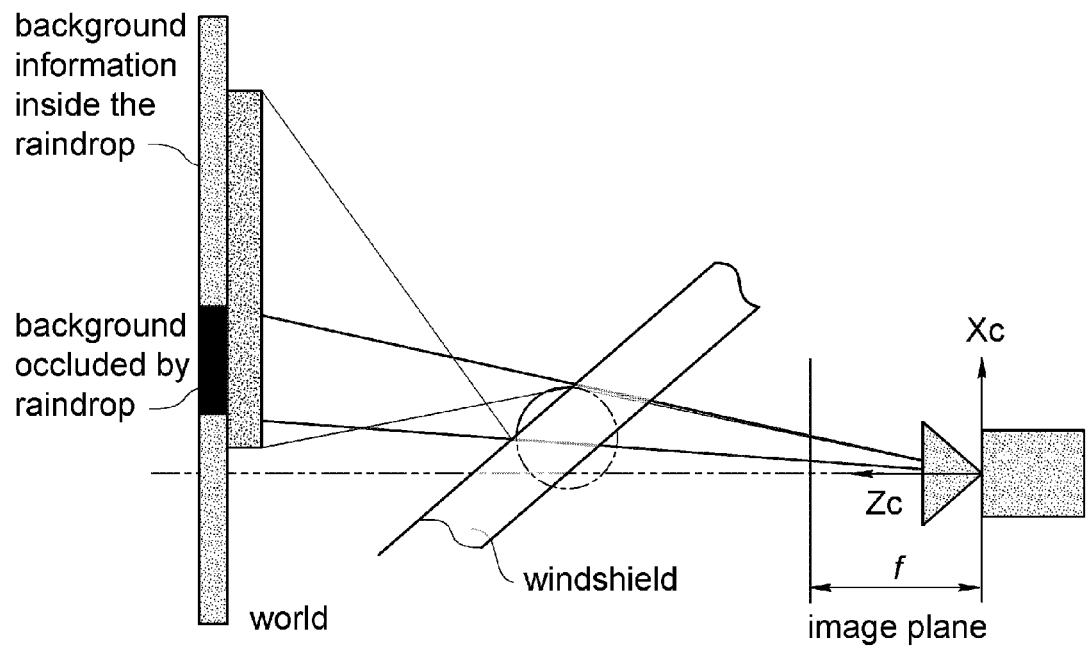
FIG. 9 shows the reconstruction of occluded background based on the application of a photometric model.

Areas on the windshield occluded by a raindrop can be reconstructed partly by application of the photometric model described in Patent Document 3. FIG. 9 shows a scene to be captured by the camera (here the scene is assumed to be a vertical wall). The solid dark area is occluded by a raindrop, hence it can not be observed by the camera. Instead of this, the camera sees the shaded region that is the refracted background inside the raindrop—the raindrop serves as a lens. By application of a photometric model the solid dark area (raindrop background) can be reconstructed partly from the image information inside the raindrop.

Figure 10:
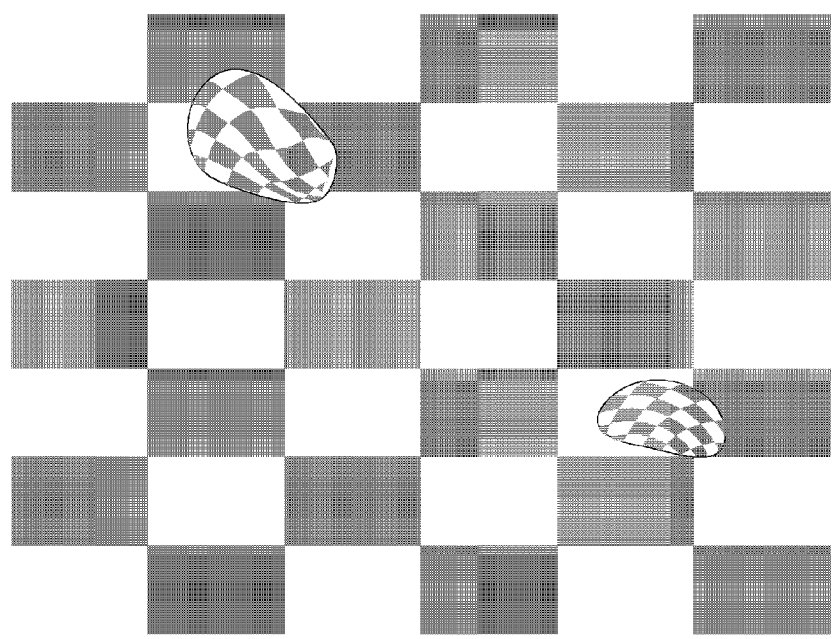
FIG. 10 shows a refracted image of a background within each raindrop.

As depicted in FIG. 10, the observed position and size of the raindrop background within the raindrop varies. However, as soon as the raindrop shape is known, the position of the raindrop background (FIG. 9, solid dark area) can be expressed only in terms of the position of the raindrop on the windshield (x, y) and the raindrop radius. Because the entire external view is reconstructed from the refracted image of a raindrop, the camera is required to have a high resolution, and the image processor is required to be able to process a large number of pixels with a minimum latency time. It may be necessary to locally apply a high resolution (on the raindrop) and thin out the resolution in the rest of the field of view. In particular, a speed-up of the computation can be achieved by affine mapping technologies. For this approach assumptions on the shape of the raindrop are made.

Figure 11:
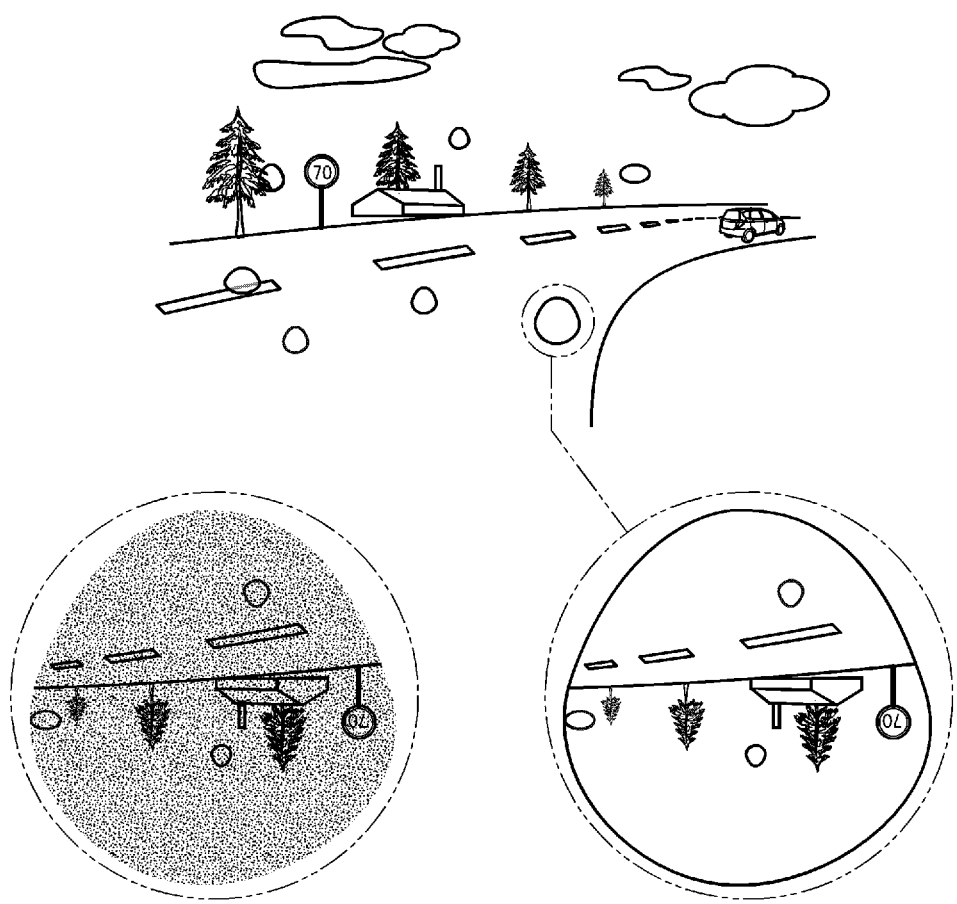
FIG. 11 shows the mapping of a view onto a raindrop using a linear mapping function.

Knowing the borders of the observed region through the raindrop (shaded area in FIG. 9), a linear mapping function can be used to approximate the accurate photometric raindrop model described in Patent Document 3. This function is inexpensive to compute and approximates the raindrop appearance sufficiently. FIG. 11 shows the results of an exemplary linear mapping function.

Figure 12:
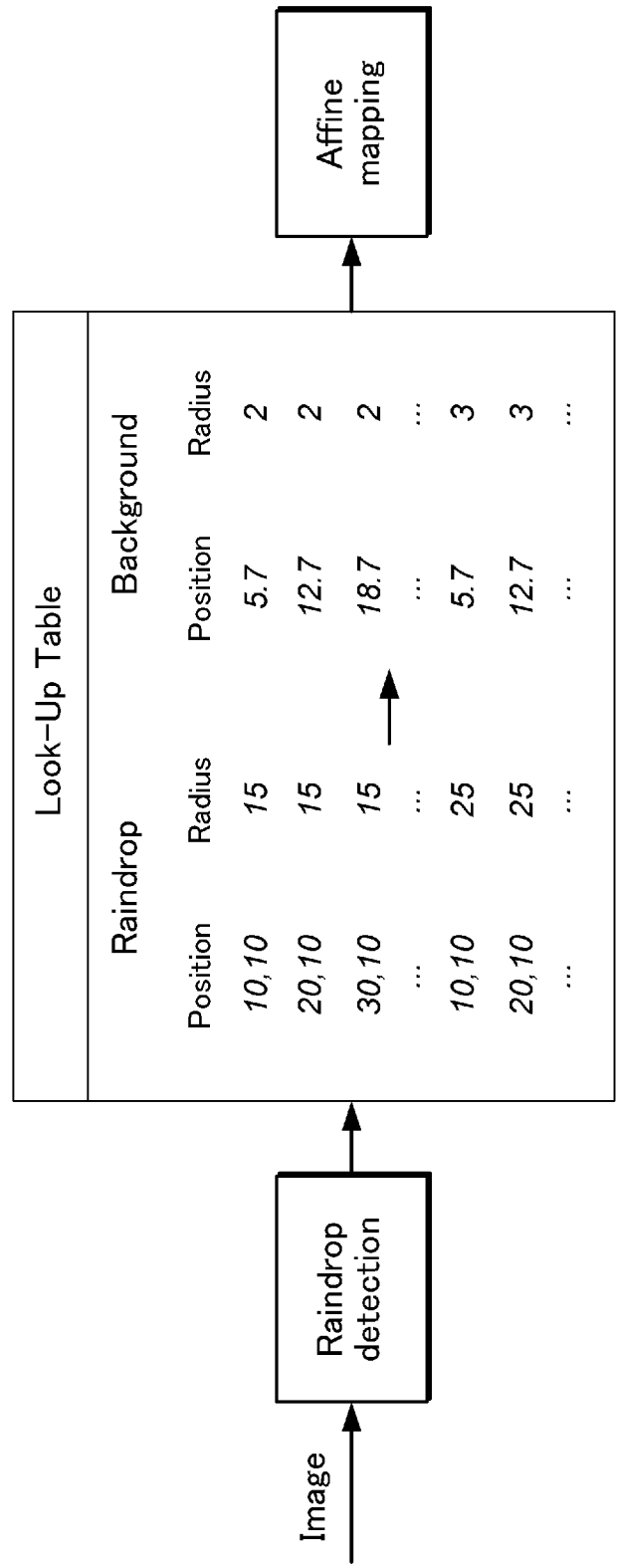
FIG. 12 is a block diagram for image reconstruction with affine mapping using a look-up table.

Another possibility for speed-up is the use of Look-Up tables (FIG. 12). Therefore the reconstruction can be achieved by an affine mapping with pixel correspondences, stored in the Look-Up table rather than by calculating the photometric model.

Selective Exclusion of Frames

Figure 13A:
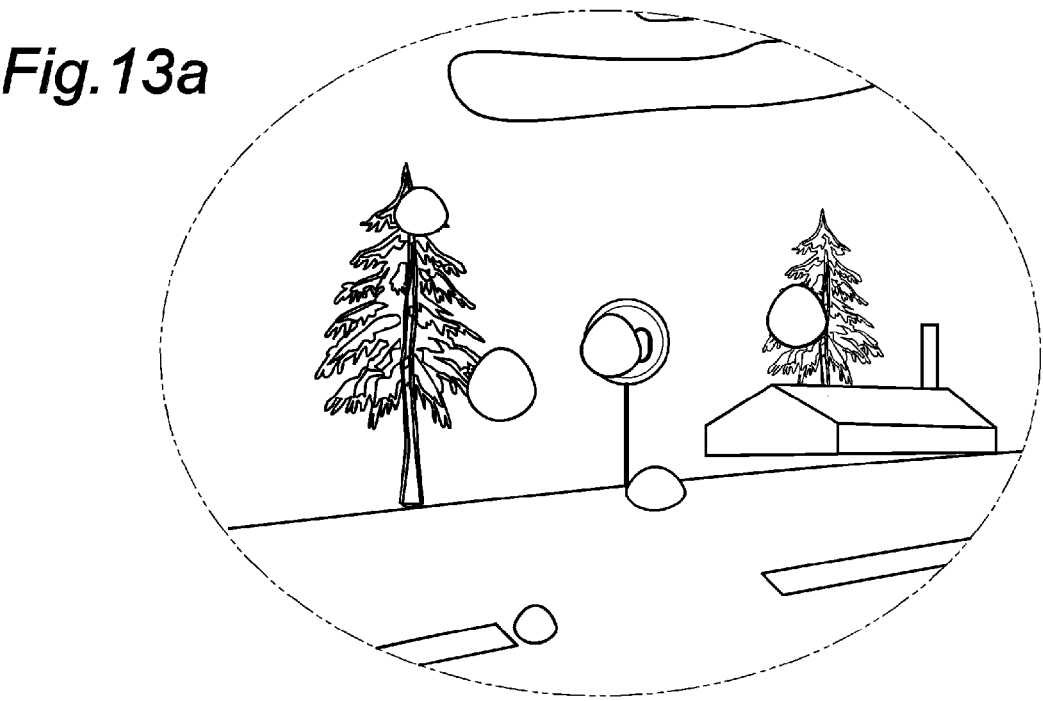
FIG. 13 is a view of a relevant object before (left) and after wiper passing (right)
Figure 13B:
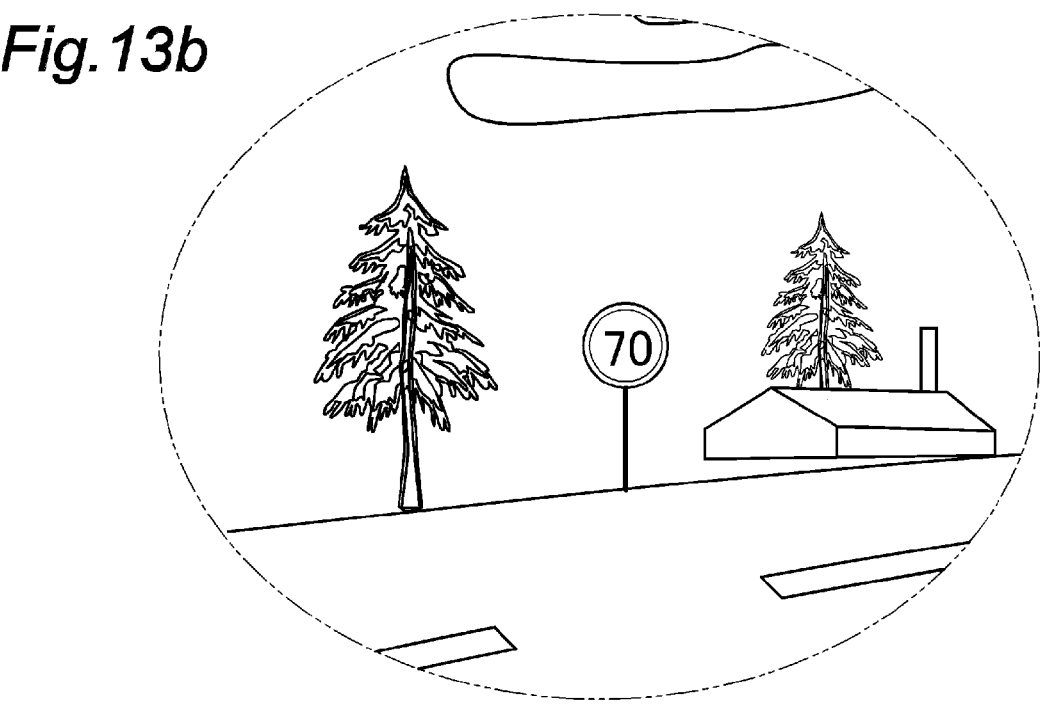
Figure 14A:
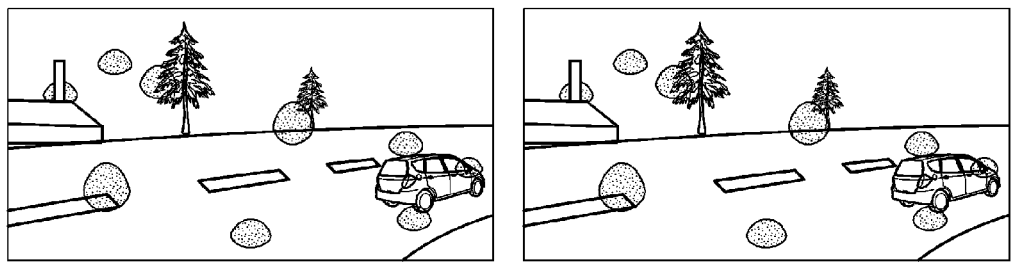
FIG. 14 is a diagram showing a process of raindrop detection to achieve improved robustness by avoiding outliers.
Figure 14B:
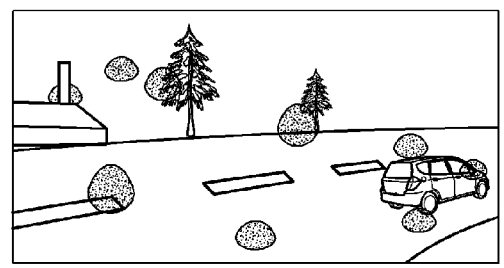
Figure 14C:
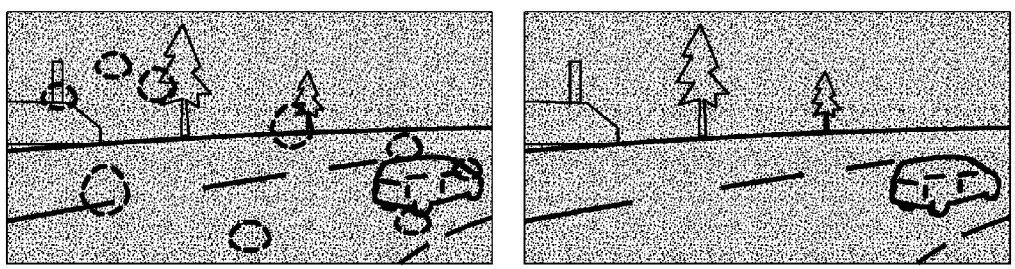
Figure 14D:
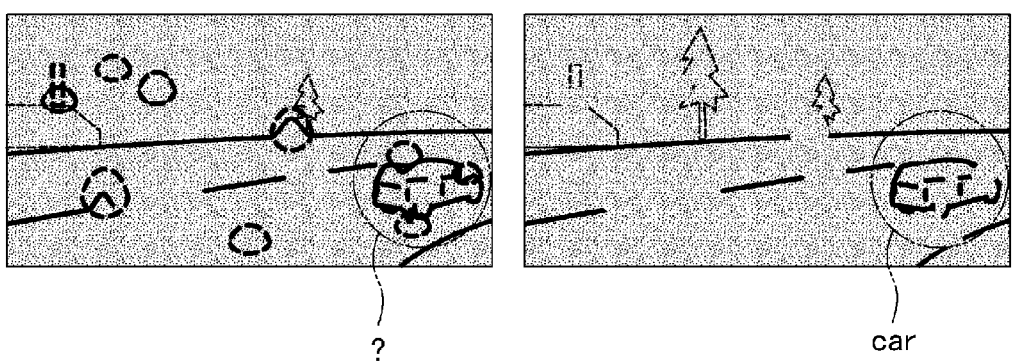

Object recognition may be restricted by applying pattern matching to image frames where the region of interest (ROI) has no or few distortions. Frames where ROIs are considerably distorted can be excluded from pattern matching. Frames with few distortions can be identified by knowledge of wiper timing. Areas with distortions can be identified by methods for raindrop and disturbed area detection. FIG. 13 shows two different frames, and a speed limit sign is extracted as a region of interest. In one of the frames, the speed limit sign is blurred by a raindrop. Such a frame may be excluded from pattern matching.

In a specific embodiment based on this concept, the system captures an external view as a series of successive frames. In some of the frames, the external view is occluded by raindrops, and this prevents a desired employment of the particular computer vision system. However, each time a windshield wiper device sweeps the windshield, the raindrops, hence the optical occlusions are removed. The computer vision system may be furnished with information on the movement of the windshield wiper device so that the removal of raindrops from the surface of the windshield may be predicted. Therefore, by suitably replacing the frames optically occluded by raindrops with adjacent frames which are free from occlusions owing to the action of the windshield wiper device, successive frames or a continuous image free from optical occlusion may be made available to the computer vision system.

Exclusion of Outliers

As a modification of this idea a method can be applied to exclude distorted areas from feature extraction such as edge or corner detection. Many object recognition modules working on image features are more robust in case of missing features than in case of wrong features (outliers). Therefore an object detection may fail on a feature images with outliers (see FIG. 14 left side) whereas the same algorithm may obtain good results if some features are missing (see FIG. 14 right side).

In the embodiment illustrated in FIG. 14, use is made of raindrop detection to achieve improved robustness by avoiding outliers in feature extraction. The raindrop detection gives a masked image where irritating outliers are suppressed.

In real DAS applications several objects need to be tracked in a so called "multi object tracking" (MOT). For MOT a management of the tracks is required in order to create new tracks, split tracks, merge tracks and delete tracks. A certain track will be deleted if an object cannot be found in the following image frames. This decision on deleting tracks requires a threshold for a minimum similarity (e.g. cross correlation) between regions of interest in different image frames. This threshold can be adapted according to known local image disturbances (e.g. raindrops) to prevent "losing" an object.

Application of Kalman Filters

Figure 15:
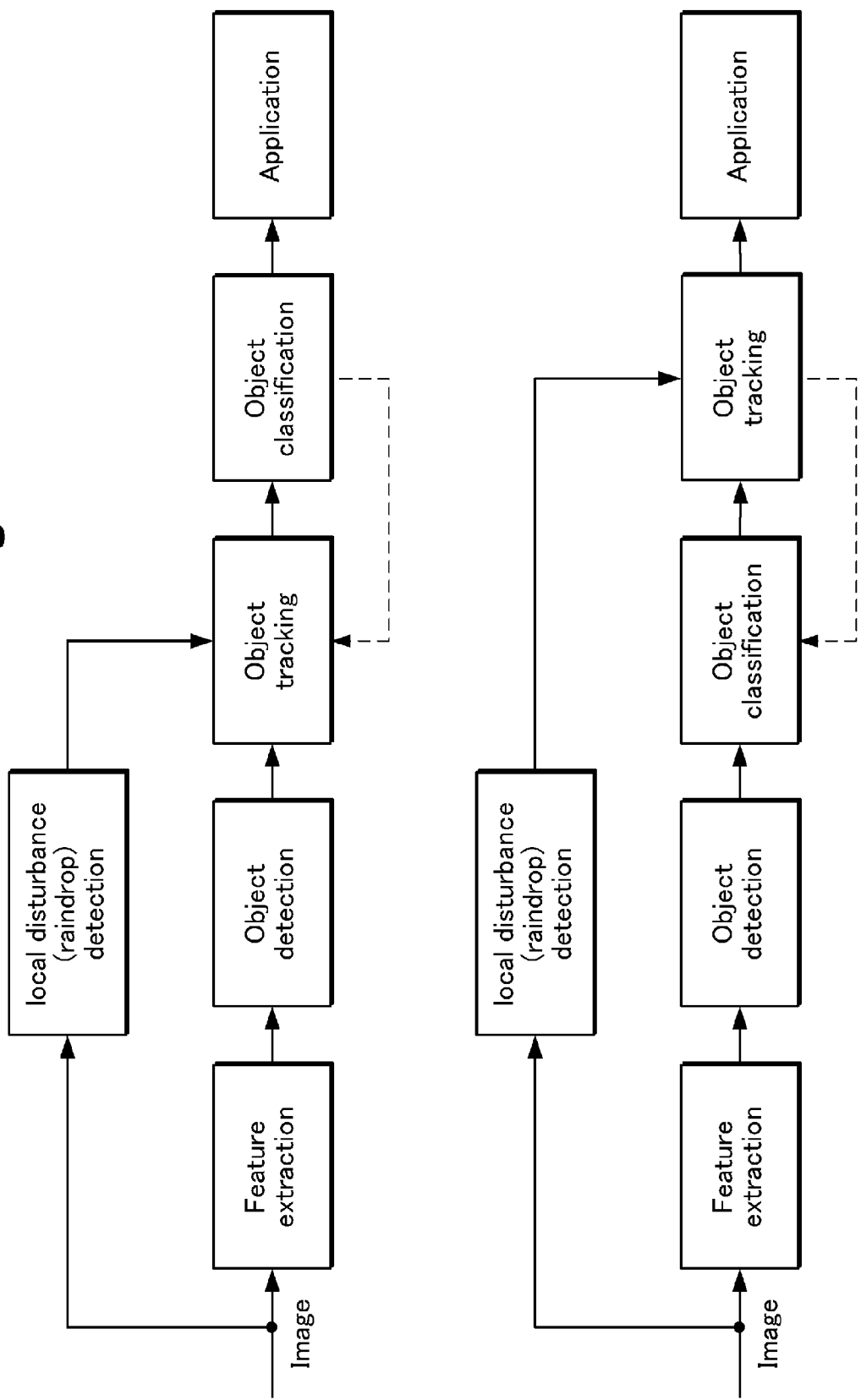
FIG. 15 is extended block diagrams of exemplary image processing systems with improved tracking performance for severe weather.

Kalman filters model properties of objects to be tracked (e.g. assumption on slowly changing velocities) and on observations that can be made (e.g. uncertainty on observed position) to track objects properties over time. So these filters allow a weighted incorporation of external observations and (internal) prediction of object properties. Knowledge on changing environment conditions enables tuning of this weighting. In other words if the external observations (=camera images) are disturbed (e.g. by raindrops on the windshield) the internal prediction of object properties should be weighted stronger to improve the overall tracking performance. Therefore an extended block diagram for processing is proposed as shown in FIG. 15. This embodiment provides an improved tracking performance even under a severe weather condition, and allows an improved robustness of (multi) object tracking.

Figure 16:
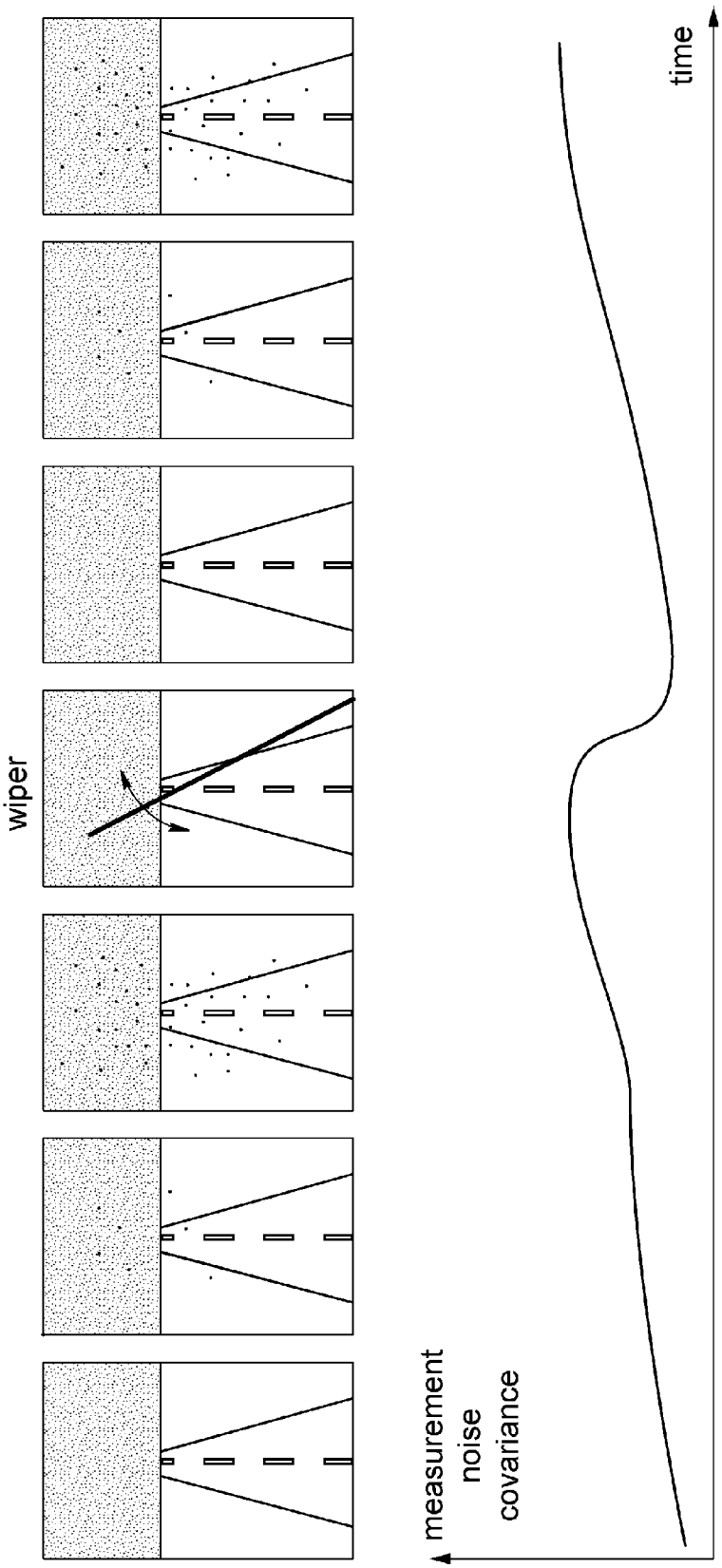
FIG. 16 is a diagram showing the adaptation of tracking parameter (for recognition uncertainty) by using knowledge of wiper movement.

Knowledge about wiper movement can be used by the (image processing) application to adapt tracking parameters: directly after wiper passing the measurement noise covariance could be reduced because the windshield can be assumed to be free of raindrops. The longer the wiper passing has passed (=the more raindrops on the windshield) the more the measurement noise covariance could be increased to model increasing recognition uncertainties caused by raindrops on the windshield (FIG. 16). This method improves the overall tracking quality by use of macroscopic information (number of raindrops) instead of the detailed location of certain local image disturbances.

Effects in front of the vehicle like local spray (caused by leading vehicles) and bright reflections (e.g. sunlight reflected by wet surface) may also lead to local and temporary "blind" areas in the scene. Knowledge about these areas can be used to improve robustness of object tracking.

Local spray effects can be obtained by high-level information. Example: it is rainy and there is a truck driving in front of the vehicle. Hence spray can be expected and object visibility in affected areas will be reduced. The required high-level information can be provided by the object classification module (as shown in FIG. 15).

Figure 17:
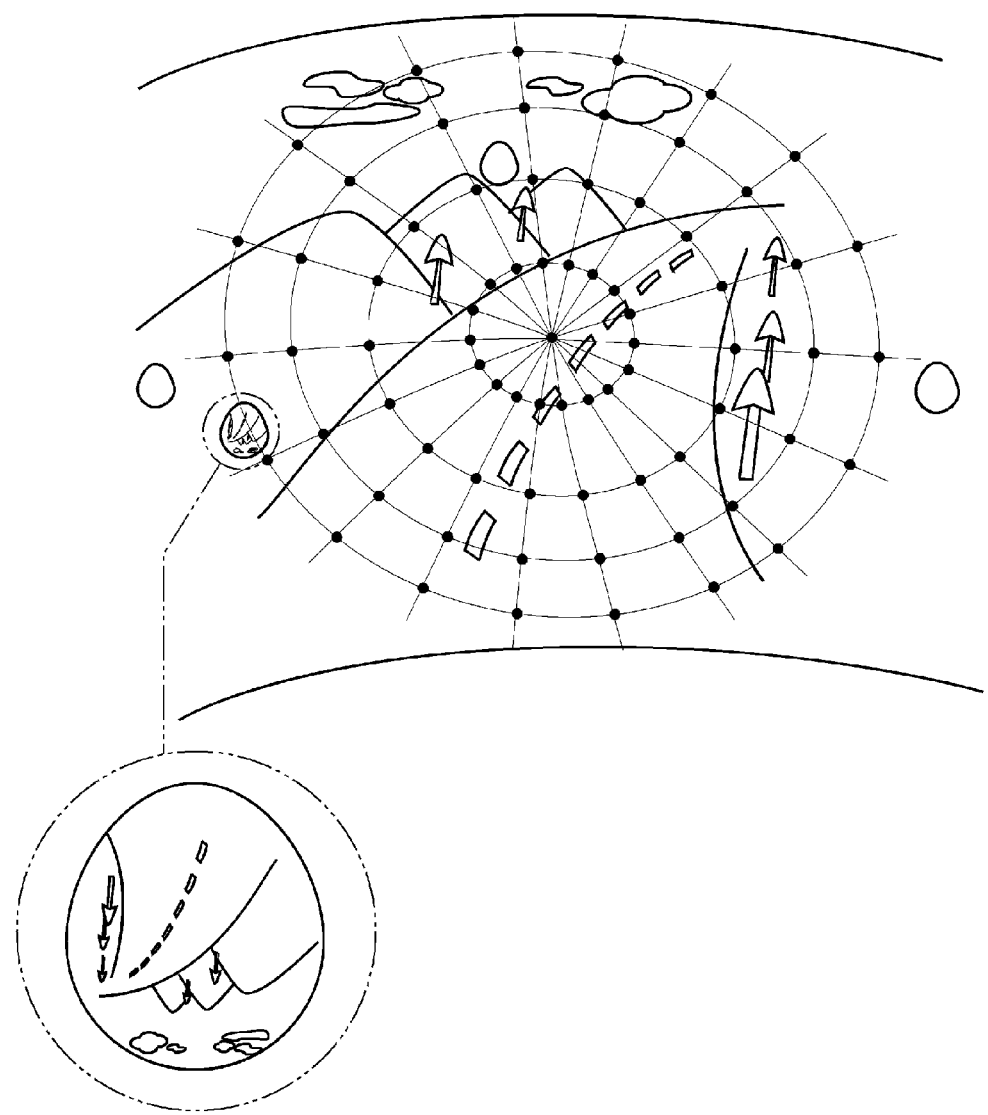
FIG. 17 is a schematic view of a scene ahead of a vehicle seen through a windshield.

In the following is described the principal concept of an algorithm for raindrop detection according to the present invention. FIG. 17 shows a view through a windshield of a vehicle captured by a camera. As shown in FIG. 17, the image of the view through the windshield is defined by a large number of pixels which are given by grid points of concentric circles and radial lines emanating from the center of the concentric circles. The density of the grid points in this illustration is significantly lower than actually is for the convenience of illustration. The concentric circles are spaced from each other by a regular interval, and the radial lines are spaced from each other by a regular angle. Other coordinate systems such as orthogonal and other rectilinear coordinate systems can also be used for locating pixels without departing from the spirit of the present invention.

By applying a standard POI (points of interest) detector like SURF, raindrops on the windshield are detected. For details of SURF, reference should be made to "Herbert Bay, Tinne Tuytelaars, and Luc Van Gool, Lecture Notes in Computer Science, volume 3951/2006, chapter SURF: Speeded Up Robust Features, pages 404-417, Springer, Berlin/Heidelberg, 2006". This algorithm can be used for detecting interesting regions in the image, that could be not only objects or road markings, but also raindrops. The task of the proposed algorithm is a distinction between environmental scene points (objects, road markings) and raindrops.

Each of the detected raindrops can be seen as an additional convex lens on the windshield that refracts light transmitted therethrough. As can be appreciated from FIG. 17, all pixels within a raindrop can be traced back to their original points in the 3D environment according to the law of refraction. In other words, all of the pixels at the grid points of the view through the windshield are associated with corresponding pixels on the raindrop in a one-to-one relationship, and the image of the raindrop can be reconstructed by suitably transforming the coordinates of the pixels of the grid points according to the Fresnel's law of refraction. In particular, the image of the raindrop is similar to or has a high correlation to the image reconstructed from the image of the surrounding scene transmitted through the windshield. Therefore, what appears to be a raindrop or a candidate of a raindrop can be verified as a raindrop if the image of the raindrop has a high correlation to the image reconstructed from the image of the surrounding scene transmitted through the windshield.

Figure 18:
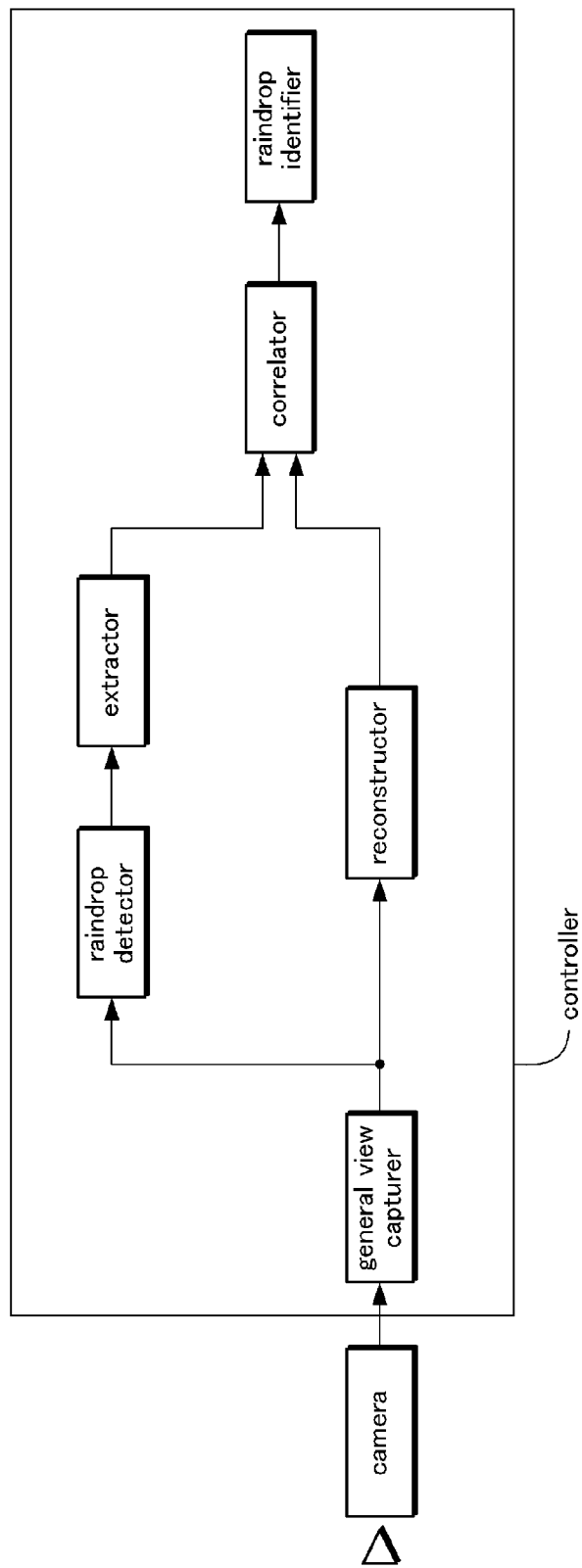
FIG. 18 is a block diagram showing functional components of an apparatus for identifying raindrops embodying the present invention.

FIG. 18 is a block diagram showing an overall structure of an apparatus for identifying raindrops according to the present invention. The apparatus essentially consists of two parts, a camera and a controller which essentially consists of a microprocessor equipped with an output unit which may be a display or another device such as a windshield wiper that is activated upon detection of raindrops. The controller is configured to execute predetermined processes according to a computer program, and perform various functions. These functions are represented by blocks in FIG. 18. These functional entities include a raindrop detector, an extractor, a general view capturer, a reconstructor, a correlator and a raindrop identifier.

The general view capturer captures an image of a scene ahead of the vehicle viewed through the windshield by using an output signal from the camera. The raindrop detector detects points of interest as raindrop candidates from the general image captured by the general view capturer by using a suitable algorithm such as "SURF". These points of interest are given as regions which are characterized by a sharp contrast to the surrounding scene or other features that would be found when a raindrop is deposited on the windshield. The extractor extracts and captures the image of each raindrop candidate from the general image. At the same time, the size of each raindrop candidate is measured.

The reconstructor reconstructs the image of each raindrop as an image of the general view refracted by the raindrop by applying Snell's law to an optical model of the raindrop. The correlator compares each of the actually extracted raindrop images with the corresponding reconstructed raindrop image. The raindrop identifier evaluates the correlation between each actually captured raindrop image and the corresponding reconstructed raindrop image, and tabulates the results. If the number of instances where a correlation is higher than a prescribed level is greater than or equal to a prescribed value, the raindrop identifier determines that there are indeed raindrops on the windshield.

In the following is described how the optical model of a raindrop can be built, and how Snell's law may be applied to it with reference to FIGS. 19 and 20. In the following description, vector values are each denoted by placing "^" immediately ahead of the corresponding letter.

First of all, a standard detector (e.g., "SURF") provides n possible raindrop candidates with position $x_i=(x_i, y_i)^T$ and radius $r_i$ (i=1, n) in the image plane so that each sensed raindrop candidate can be described completely by $\hat{p}_i=(x_i, y_i, r_i)^T$. Based on these detection results, each raindrop candidate is tested with an algorithm according to the present invention. The algorithm according to the present invention will be explained in the following taking into account one possible raindrop candidate $\hat{p}=(x, y, r)^T$. Note that only light rays are considered that are actually running through that raindrop candidate $\hat{p}$ and reaching the camera's optical center O.

Figure 19:
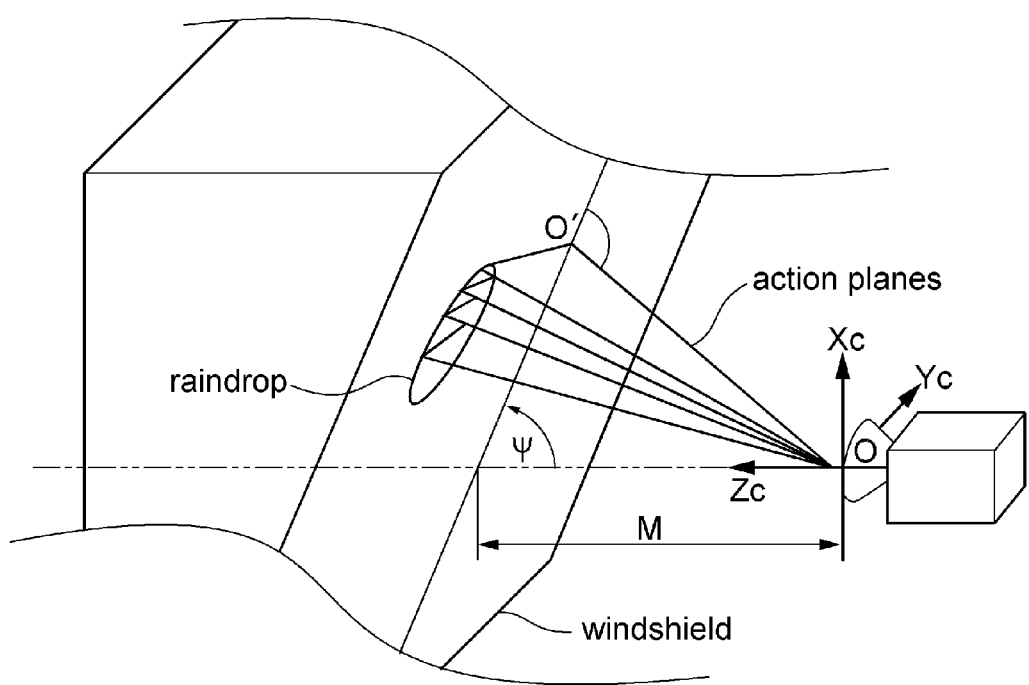
FIG. 19 is a diagram showing a geometric framework of a raindrop optical model with action planes according to the present invention.

A 3D camera coordinate system $\hat{X}=(X_C, Y_C, Z_C)^T$ is built as shown in FIG. 19 with its origin lying at the camera's optical center O. The optical axis makes an angle $\Psi$ with the inner windshield plane and intersects it at a distance M. The optical center O, its orthogonal projection O' on the inner windshield plane and each scanned point on the detected blob (raindrop candidate) produce an 'action' plane, with the major action plane (defined by the points O, O', and the raindrop center on the inner windshield plane) being of particular interest. Such a plane is called an action plane because, according to Snell's law of refraction, the light ray passing through the corresponding scanned point to the optical center never leaves this plane ever since coming from the raindrop surface. So, the light ray is always in this plane but not necessarily so before it reaches the raindrop.

Figure 20:
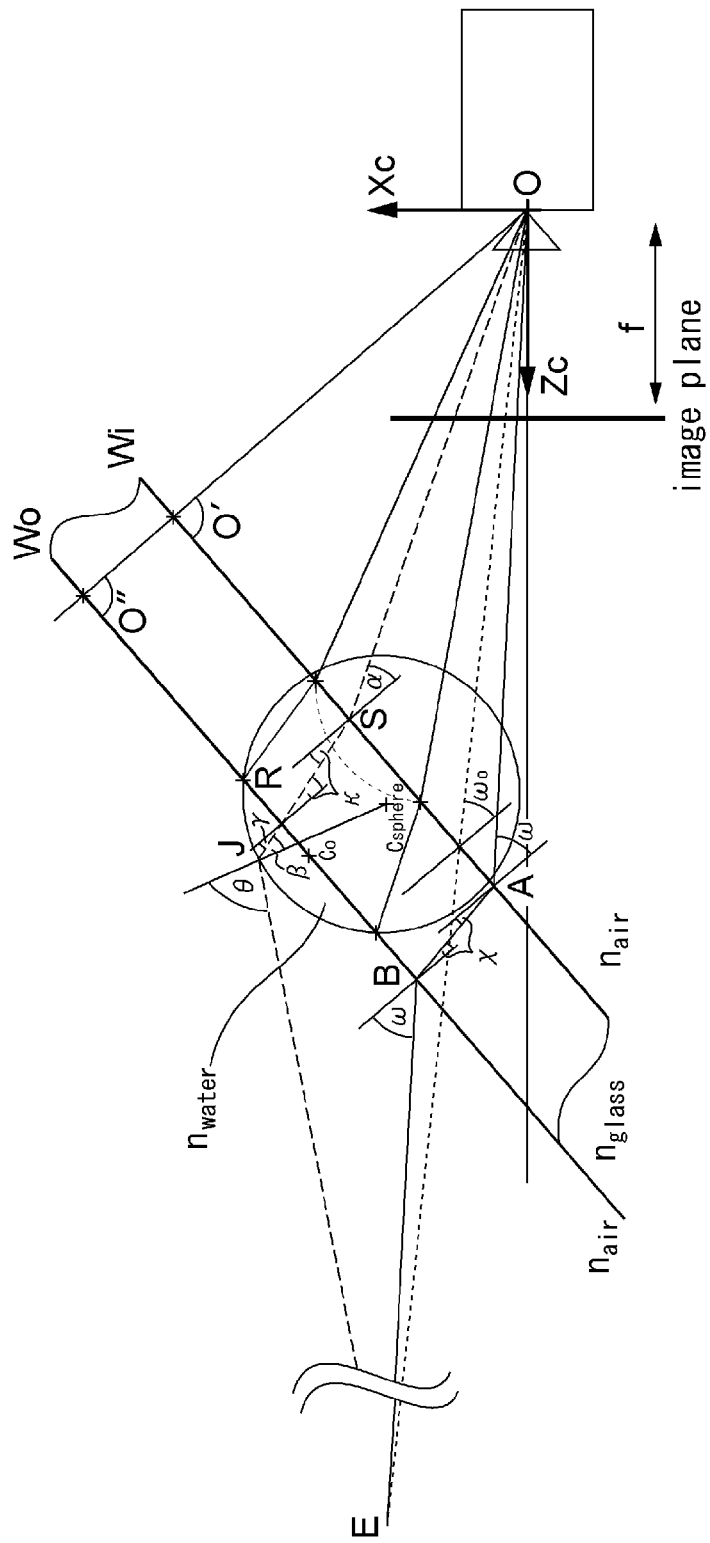
FIG. 20 is a diagram of a refraction model in each action plane.

FIG. 20 shows a detailed view of one of the action planes. The windshield of thickness T is modeled as two parallel planes $W_i$ (inner plane) and $W_o$ (outer plane). Hence, the orthogonal projections on $W_i$ and $W_o$ are given respectively by $$\hat{O}'=M \sin \Psi \hat{n}_W \quad (1)$$

$$\hat{O}''=\hat{O}'+T\hat{n}_W=(M \sin \Psi+T)\hat{n}_W \quad (2)$$

where $\hat{n}_W=(\cos \Psi, 0, \sin \Psi)^T$ is the windshield normal. The real-world coordinates on the inner windshield plane $W_i$ of $\hat{p}$ can then be determined using the pinhole camera model and the focal length f:

$$X_i=Z_i(x/f) \quad (3)$$

$$Y_i=Z_i(y/f) \quad (4)$$

$$Z_i=M \sin \Psi/\{\tan \Psi+(x/f)\} \quad (5)$$

Accordingly, the corresponding raindrop radius is $$R_i=Z_i(r/f) \quad (6)$$

Due to glass refraction effects on $W_i$, the raindrop position on $W_o$ slightly varies and its radius is actually larger than it appears through the windshield glass. Hence, in order to determine the actual position $X_o$ and size $R_o$ of the sensed raindrop on $W_o$, the raindrop extremities (see FIG. 20) within the major action plane (spanned by OO' and $OX_i$) are traced to their counterparts on $W_o$.

All other rays in between the extremities can be traced using Snell's law of refraction as follows. Consider any given ray $\hat{S}=OS=(X_S, Y_S, Z_S)^T$ as depicted in FIG. 20 (dashed line)

on $W_i$. The angle of incidence of vector $\hat{S}$ with respect to the windshield normal is then given by $$\alpha = \arccos \{(\hat{S} \hat{} n_W)/\|\hat{S}\|\} \tag{7}$$

The piercing point R of the ray with $W_o$ can be determined using Snell's law, refraction indices of air and glass and Equation (1).

$$\kappa = \arcsin \{n_{air} \sin \alpha/n_{glass}\} \tag{8}$$

$$\hat{R} = \hat{S} + T\{\hat{} n_W + (\tan \kappa/\|SO'\|)(\hat{S} - M \sin \Psi \hat{} n_W)\} \tag{9}$$

This means that for any point on the raindrop whose image coordinates are known, its XYZ-coordinates on $W_o$ can be determined. The above equations also provide the XYZ-coordinates of the interface extremities on $W_o$ since the corresponding coordinates of the blob extremities on $W_i$ are known. Once the interface extremities are determined, the real blob radius $R_o$ and its position $X_o$ on $W_o$ can be obtained.

The shape of fluid droplets on solid surfaces is modeled using the Young-Laplace equation that describes the relation between surface tension, pressure and curvature. The contact angle $\tau$ between the raindrop surface and windshield plane $W_o$ plays the role of a boundary condition. In addition to the above relations, the exact contact angle depends on the treatment of the solid surface as well as the rainwater consistency. Typical values can be found in literature ($\cong$30 to 50 degrees) that meet experimental results performed before.

For simplicity, the raindrop is considered as a section of a sphere or a spherical cap with $R_0$ as the radius of the cut surface and $\tau$ as the contact angle between the raindrop surface and the windshield plane $W_o$. The sphere radius $R_{sphere}$ can then be determined as $$R_{sphere} = Ro/\sin \tau \tag{10}$$

that leads to the actual center of the whole sphere:

$$\hat{C}_{sphere} = \hat{C}_o - \hat{} n_W R_{sphere} \cos \tau \tag{11}$$

Considering the dashed ray from FIG. 20, point J on the raindrop surface can be determined as the piercing point of the ray coming back from point S and being refracted at point R towards $\hat{} n_W$ according to the refractive indices $n_{glass}$ and $n_{water}$ $$\gamma = \arcsin(n_{glass} \sin \kappa/n_{water}) \tag{12}$$

Figure 21:
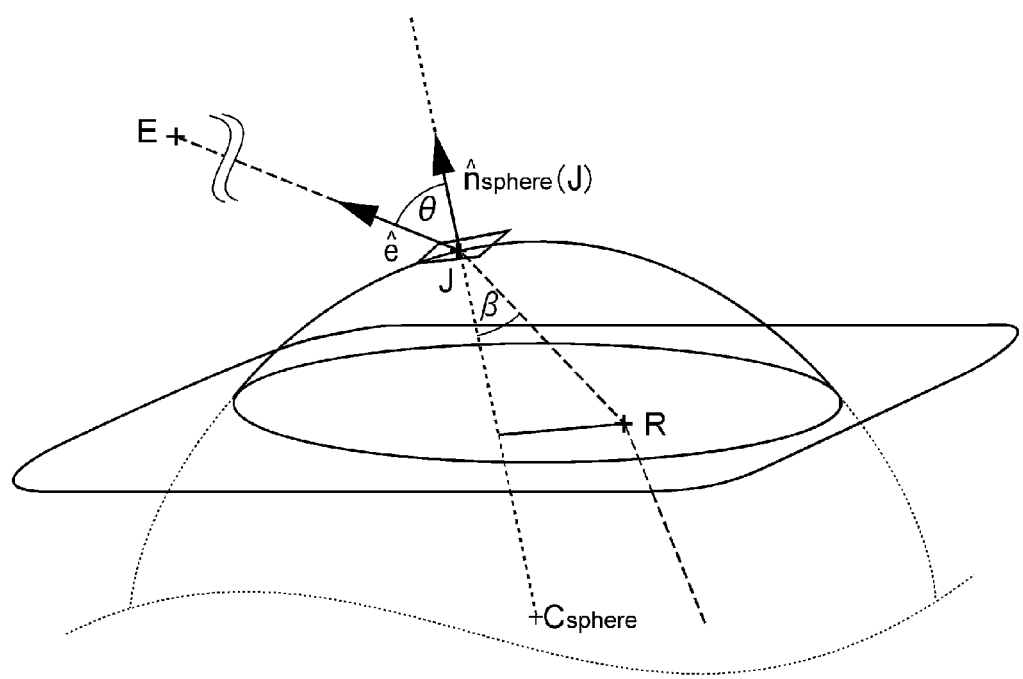
FIG. 21 is a diagram of a refraction model at a raindrop surface point.

The angle of incidence at the raindrop surface is particularly important for identifying refracted environment areas. The angle of refraction at point J is given by:

$$\beta = \arccos \{\hat{} n_{sphere}(\hat{J})(RJ)/\|RJ\|\} \tag{13}$$

where the raindrop surface normal $\hat{} n_{sphere}(\hat{J})$ is now dependent on the surface point J. Hence, the ray will leave the action plane in FIG. 20. The incident ray at point J lies in a plane spanned by points R, J and $C_{sphere}$ as depicted in FIG. 21.

The angle of incidence $\theta$ made by the surface normal $\hat{} n_{sphere}(\hat{J})$ and the opposite direction of light propagation $\hat{e}$ can be determined in line with Equation (12) but with $\beta$, $n_{water}$ and $n_{air}$. In case $\theta$ is complex, no refraction occurs at point J, or rather no light can reach the optical center from this point. On the other hand, if $\theta$ is real-valued, then light does reach the optical center from point J. This allows the algorithm according to the present invention to find the point E in the environment from which this light ray emanates, assuming that the point E lies on a known environment plane. For simplicity, it is assumed that this plane is vertical as expressed by an equation $(\hat{} n_{env} \hat{} x) + d = 0$. Note, however, that this algorithm works for any plane (or any geometrical surface) in the environment and not only vertical planes.

As seen in FIG. 17, the majority of the environment points mapped by the raindrop actually lie outside of the region covered by the raindrop (i.e., the raindrop background). This shows that the optical intensity of a raindrop on a car windshield is not highly dependent on its background, but rather on the environment geometry and photometry.

In order to decide on the raindrop candidate, the 3D environment point E has to be traced according to an observation at position x in the image plane, as denoted by the light ray going from the point E to the point O after passing through the air into the windshield glass and into the inside of the vehicle. The light ray is incident to $W_o$ at an angle $\omega$ and leaves $W_i$ making also an angle $\omega$ with the opposite of $\hat{} n_W$. The dotted line EO makes an angle $\omega_o$ with $\hat{} n_W$ which is calculated to be $$\omega_0 = \arccos \{(OE) \hat{} n_W/\|OE\|\} \tag{14}$$

Note that the points E, B, A, O, O', and O" are all in the same action plane. Finding $\omega$ results in a nonlinear problem which can be solved by standard techniques like the Newton-Raphson method that iteratively solves the root problem $$f(\omega) = (x^*_E - x^*_B) \cot(\omega + \Psi_P) - (y^*_E - y^*_B) = 0$$

(where $(x^*_E, y^*_E)$, $(x^*_B, y^*_B)$ and $\Psi_P$ are the projection of E, B, and $\Psi$, respectively, on the action plane mentioned above) starting with the initial angle $\omega_0$.

Based on the sensed location of a blob, the algorithm according to the present invention determines the exact path of all light rays that are interacting with the raindrop, starting in the image plane and tracing them back to the environment. However, in order to compare the environment with the raindrop candidate, predicting the observed pixel intensity is at least as essential as the exact ray tracing discussed above. Hence, the algorithm uses the environment intensities and Fresnel's reflectivity coefficients (as explained in the previous section).

When light moves from a medium of a first refractive index $n_1$ into a medium with a second refractive index $n_2$, both reflection and refraction of light may occur. Since in this application only the refracted part accounts for the light that reaches the optical center due to the geometry of the raindrops on a car windshield, it is expected that only a percentage of the incident ray intensity to be refracted from one medium to the next. This is given by $$I_2 = (1 - R_{12})I_1 \tag{15}$$

where $R_{12}$ is Fresnel's reflectivity coefficient for unpolarized light going from medium 1 to medium 2.

$$R_{12} = 1/2(R_{12\S}^2 R_{12\perp}^2) \tag{16}$$

with $$R_{12\perp} = \frac{n_1 \cos\mu_1 - n_2 \cos\mu_2}{n_1 \cos\mu_1 + n_2 \cos\mu_2} \tag{17}$$

$$R_{12\|} = \frac{-n_2 \cos\mu_1 + n_1 \cos\mu_2}{n_1 \cos\mu_1 + n_2 \cos\mu_2} \tag{18}$$

Since $I_A$ is known from the camera, this intensity is transmitted by the light ray going from the point E to the optical center via raindrop and glass refraction. The estimated raindrop intensity $I\hat{}_S$ at the point S can be determined as $$\hat{I}_S = \frac{I_A}{\Pi_i(1-R_i)^3} \quad (19)$$

where $R_i$ are the Fresnel's reflectivity coefficients at all points where refraction between two media occurs (i.e., i∈{A, B, J, R, S}, see FIG. 20) and j stands for the direction of the intensity prediction:

$$j = \begin{cases} -1, & \forall i \in \{A, B\} \\ 1, & \text{else} \end{cases} \quad (20)$$

Table 1 shows all relevant information for estimating $\hat{I}_S$:

Table 1

TABLE 1

| point | transition | $\eta_1$ | $\eta_2$ | $\mu_1$ | $\mu_2$ |
|---|---|---|---|---|---|
| A | air/glass | $\eta_{air}$ | $\eta_{glass}$ | ω | χ |
| B | glass/air | $\eta_{glass}$ | $\eta_{air}$ | χ | ω |
| J | air/water | $\eta_{air}$ | $\eta_{water}$ | θ | β |
| R | water/glass | $\eta_{water}$ | $\eta_{glass}$ | γ | κ |
| S | glass/air | $\eta_{glass}$ | $\eta_{air}$ | κ | α |

In order to reach a decision about the raindrop candidate, the error between observed pixel intensities $I_S$ and estimated intensities $\hat{I}_S$ is evaluated using the correlation coefficient (CC), defined as $$CC = \frac{1}{N\sigma_{\hat{I}}\sigma_I} \sum_{i=1}^{N} (\hat{I}_i - \bar{\hat{I}})(I_i - \bar{I}) \quad (21)$$

where $\bar{I}$ and $\sigma_I$ are mean value and standard deviation for the observations, respectively (and $\bar{\hat{I}}$ and $\sigma_{\hat{I}}$ for the estimated, respectively) and N is the number of all estimates.

Although the visual results are quite accurate and some high correlation coefficients are achieved, the correlation in general is less significant. This can be explained due to the following reasons:

Firstly, a raindrop can be assumed as an additional lens on the windshield, so that the light rays incident to the raindrop diverge and each observed point on the raindrop integrates the light of an environmental area. Secondly, the raindrop appears blurred, since the camera focuses at infinity. This leads to bad observations of the raindrop and low correlation results even when the algorithm obviously performs precisely. However, the goal was to develop a physically correct model for relating the environment to the observed raindrop candidate and finding an accurate reconstruction. To achieve meaningful correlation results the effects described above will be compensated if required. Compensation is done by blurring the direct view and the reconstructed view according to the camera lens geometry and the optical geometry sketched in FIG. 20.

To reduce sensitivity of detection concerning the accuracy of the initial raindrop candidate position a variation of the initial positions is applied. The best match is taken out for the correlation result.

Figure 22:
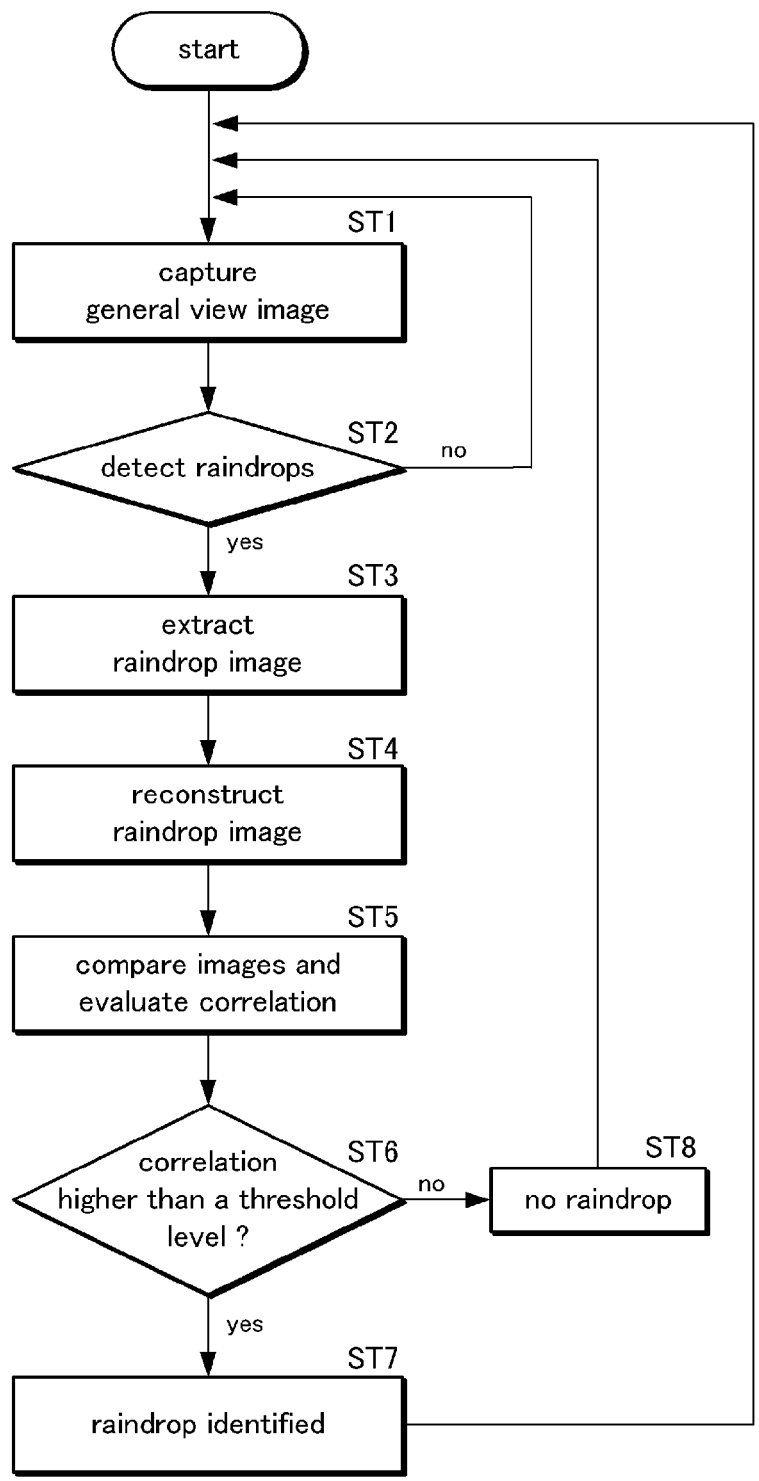
FIG. 22 is a flowchart showing an exemplary control process for identifying a raindrop according to the present invention.

FIG. 22 shows a flowchart of the control process executed by the controller. First of all, the scene ahead of the vehicle is captured by the general view capturer by using the camera in step ST1, and it is determined if there is any raindrop candidate on the windshield in step ST2. When no raindrop candidate is detected, the program flow returns to step ST1.

If a raindrop candidate is detected in step ST2, an image of the raindrop candidate is extracted in step ST3. By using a suitable optical model, an image of the raindrop is reconstructed from the general scene image in step ST4. The reconstructed image is compared with the actually extracted image of the raindrop, and a correlation between them is evaluated in step ST5. If the correlation is higher than a prescribed level (yes in step ST6), the raindrop candidate is identified as a genuine raindrop in step ST7, and the program flow returns to step ST1. If the correlation is lower than the prescribed level (no in step ST6), the raindrop candidate is not identified as a raindrop in step ST8, and the program flow returns to step ST1.

Figure 23:
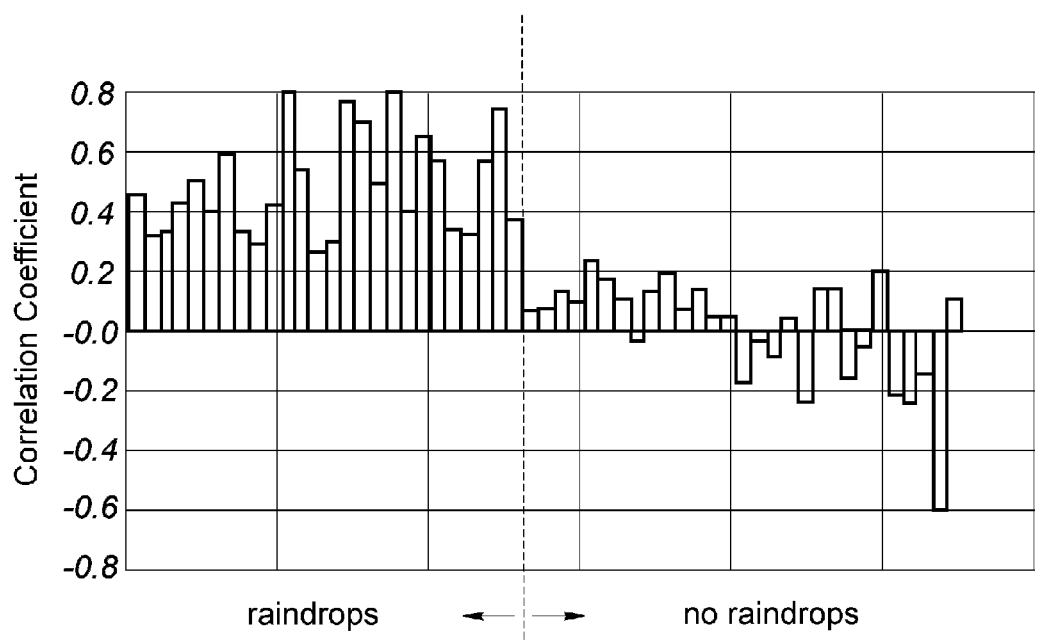
FIG. 23 is a graph of correlation coefficients obtained from a number of raindrop candidates.

With regard to the case where a large amount of raindrops are falling on the windshield, a 100% classification is not needed. So, incorporating these steps is not necessary for the implementation of the present invention. As depicted in FIG. 23, the correlation coefficient is already distinct enough to decide between raindrop and 'no raindrop'.

The image of a raindrop was reconstructed from the general image in the foregoing embodiment, but it is also possible to reconstruct the general image from an image of a raindrop, and compare the correlation between the actual general image and reconstructed general image as illustrated in the block diagram of FIG. 24.

In detecting raindrops on a windshield, it is important that the raindrops are extracted and identified as accurately as possible. In actual implementation, there are so many sources of optical noises and disturbances that it is highly desirable to use various screening methods to achieve a high identification accuracy. FIGS. 25a to 25d illustrate the principle of such a method.

Figure 25B:
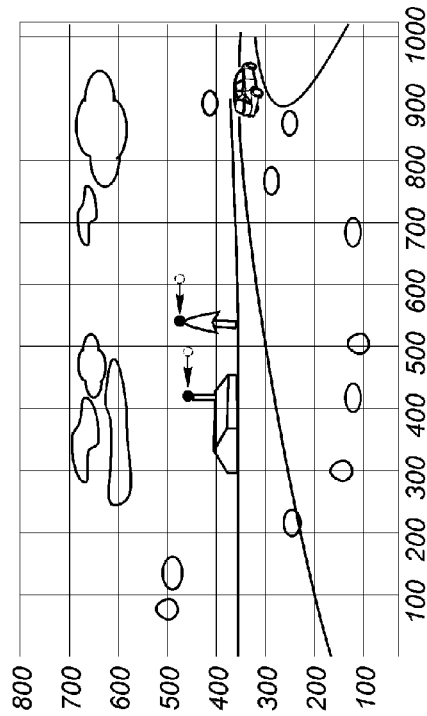
FIGS. 25a to 25d are views through a windshield that change as the vehicle travels.
Figure 25D:
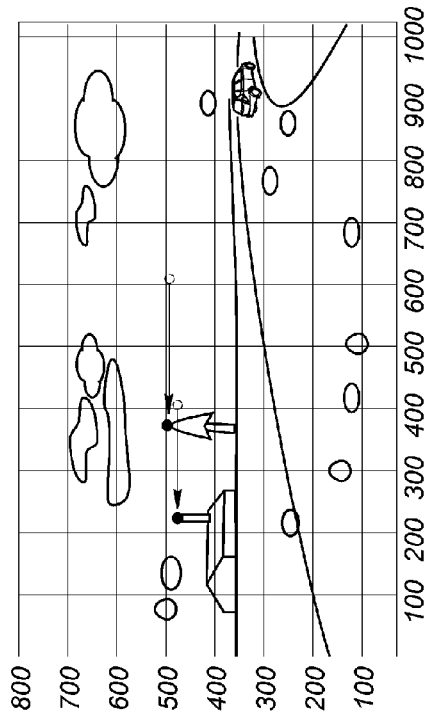
Figure 25A:
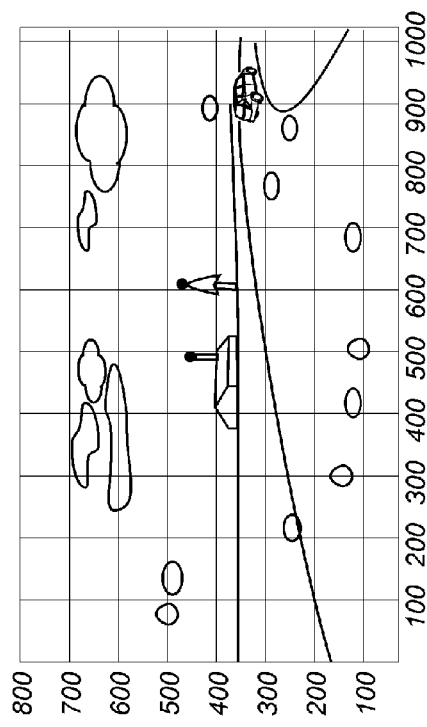
Figure 25C:
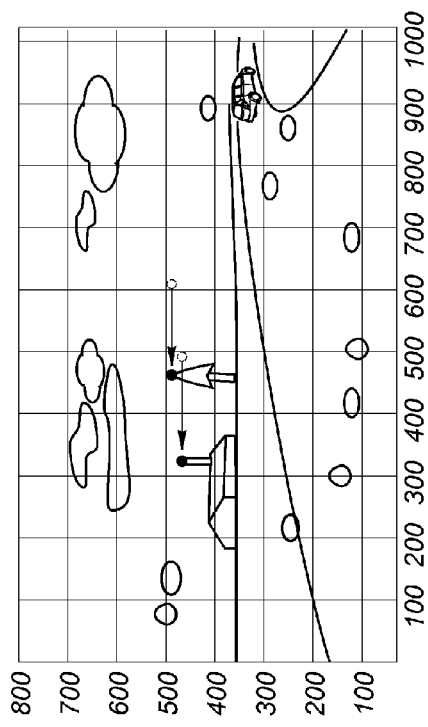

Assuming that POI's are detected (e.g., with the help of a POI detector like SURF or Harris Corner Detector) as shown in FIG. 25a. Then, multitarget tracking is applied (one tracker for each POI) to search for the POI (observed in frame i) again in frame i+1 and refer these points to each other. It can be seen in FIGS. 25b-25d that the POI's observed in frame i can be referred to their corresponding POI's in the subsequent frames and a trace of these points can be calculated. Obviously, two different behaviors are dominant: the POI's that belong to the environment are moving due to the change in the perspective viewing angle of the camera (egomotion of the vehicle), whereas all POI's that are attached to the windshield are motionless (since the windshield is part of the reference frame of the camera). After tracking the POI's for some iterations, a reliable distinction between disturbed areas on the windshield and environmental points can be drawn by observing the trace of each POI. As soon as this trace exceeds a certain tolerance the possibility of a raindrop (or disturbed area on the windshield) will rapidly decrease.

The simple decision as discussed in the foregoing disclosure will work satisfactorily with the majority of the raindrops (as can be seen in FIG. 25a). However, some raindrops are not motionless with regards to the camera. With increasing vehicle velocity, some raindrops start moving upwards. An additional effect is that some raindrops which exceed a certain size will run downwards. Such motions of raindrops occur in terms of both paths and speeds in dependence on the size of each raindrop, contour of the windshield and airspeed of the vehicle.

These more sophisticated effects can be covered by extending the proposed algorithm with a motion model for the raindrops. This model should allow some substantially vertical movements for the raindrop. Note that a distinction between raindrops and environment can still be drawn, since due to the perspective motion of the scene, most POI's from the environment are not moving vertically. It should be noted that this method may also be used by itself for detecting raindrops, instead of being used as a part of the method based on the reconstruction of the overall image from the refracted image of each raindrop.

Once the presence of raindrops on the windshield is detected, the detection result may be forwarded to a display to provide a warning to the vehicle operator or to another device such as a windshield wiper that is configured to be automatically activated upon detection of raindrops.

Although the present invention has been described in terms of a preferred embodiment thereof, it is obvious to a person skilled in the art that various alterations and modifications are possible without departing from the scope of the present invention which is set forth in the appended claims.

The contents of the original International patent application (PCT/JP2009/000181) on which the Paris Convention priority claim is made for the present application as well as those of the documents mentioned in this application are incorporated in this application by reference.

The invention claimed is:

1. A method for image restoration in a computer vision system, comprising:
capturing a first image of an object that is optically occluded by a contamination comprising at least one raindrop;
capturing a second image of the object from a different view point; and
reconstructing an optically occluded part of the first image by using information in the second image,
wherein the first and second images of the object are captured as a plurality of frames corresponding to successive time points, and upon detection of an optical occlusion in any one of the frames, the optically occluded part of the image in the incident frame is reconstructed from a refracted image of the at least one raindrop, and
wherein the image of the object is captured through a substantially transparent sheet that can be optically occluded by contamination and is equipped with a wiper configured to wipe a surface of the transparent sheet to remove such contamination at a regular interval, and the reconstruction of the optically occluded part of the image is performed by using a frame from which contamination has just been removed by the wiper.

2. The method according to claim 1, wherein the object is stationary and the first image is captured by a camera carried by a moving platform at a first time point, the second image being captured by the cameral at a second time point which is temporally displaced from the first time point.

* * * * *